US012291028B2

(12) United States Patent
Yamasaki

(10) Patent No.: US 12,291,028 B2
(45) Date of Patent: May 6, 2025

(54) PRINTING APPARATUS, PRINTING CONTROL METHOD, AND NON-TRANSITORY COMPUTER-READABLE RECORDING MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 180 days.

(21) Appl. No.: 18/076,944

(22) Filed: Dec. 7, 2022

(65) Prior Publication Data

US 2023/0191778 A1 Jun. 22, 2023

(30) Foreign Application Priority Data

Dec. 22, 2021 (JP) ................................ 2021-207978
Jun. 22, 2022 (JP) ................................ 2022-099974

(51) Int. Cl.
*B41J 2/045* (2006.01)

(52) U.S. Cl.
CPC ......... *B41J 2/04551* (2013.01); *B41J 2/0456* (2013.01); *B41J 2/04586* (2013.01)

(58) Field of Classification Search
CPC ... B41J 2/04551; B41J 2/0456; B41J 2/04586
See application file for complete search history.

(56) References Cited

U.S. PATENT DOCUMENTS 6,286,517 B1 9/2001 Weber et al.
9,434,194 B2 9/2016 Iritani et al.

FOREIGN PATENT DOCUMENTS

JP 2001293905 A 10/2001
JP 2003534083 A 11/2003
JP 2010120291 A 6/2010
JP 2013156772 A * 8/2013 ................ B41J 2/07
JP 2015229327 A * 12/2015

OTHER PUBLICATIONS

Japanese Office Action (and an English language translation thereof) dated Jun. 13, 2023, issued in counterpart Japanese Application No. 2022-099974.

* cited by examiner

*Primary Examiner* — Jason S Uhlenhake
(74) *Attorney, Agent, or Firm* — Holtz, Holtz & Volek PC

(57) ABSTRACT

A printing apparatus includes: a print head that includes a plurality of nozzles ejecting an ink and performs printing on a print target; and at least one processor that controls an ejection operation of the print head based on ejection specification data defining ejection of the ink. At least a "first mode" and a "second mode" are provided with respect to the application of the ejection specification data, and the processor switches between the "first mode" and the "second mode" based on a set printing density.

9 Claims, 22 Drawing Sheets

FIG. 23

| TRANSPARENT EFFECT LEVEL | PRINTING DENSITY OF UNDERCOATING |
|---|---|
| 1 | 300% |
| 2 | 250% |
| 3 | 200% |
| 4 | 150% |
| 5 | 100% |
| 6 | 50% |
| 7 | 0% |

FIG. 24

| | DESIGN |
|---|---|
| GROUP A | CHARACTER |
| | NATIONAL FLAG |
| | ⋮ |
| GROUP B | OTHER THAN GROUP A |

FIG. 25

| | OCCASION |
|---|---|
| OCCASION A | SPORTS EVENT |
| | ANIMATION EVENT |
| | ⋮ |
| OCCASION B | OTHER THAN OCCASION A |

FIG. 26

| | REFERENCE DENSITY RANGE | |
|---|---|---|
| R | 150 | 170 |
| G | 100 | 120 |
| B | 100 | 120 |

PRINTING APPARATUS, PRINTING CONTROL METHOD, AND NON-TRANSITORY COMPUTER-READABLE RECORDING MEDIUM

CROSS-REFERENCE TO RELATED APPLICATIONS

This application claims the priority to and benefit of Japanese Patent Application No. 2021-207978 filed on Dec. 22, 2021 and Japanese Patent Application No. 2022-099974 filed on Jun. 22, 2022. The entire specification, claims, and drawings of Japanese Patent Application No. 2021-207978 and Japanese Patent Application No. 2022-099974 are incorporated herein by reference.

BACKGROUND

1. Technical Field

The present disclosure relates to a printing apparatus, a printing control method, and a non-transitory computer-readable recording medium.

2. Related Art

Conventionally, printing apparatuses (nail printers) that print nail designs on nails of fingers or the like have been known (see, for example, JP 2003-534083 A).

In such printing apparatuses, for example, an undercoating layer is sometimes formed by applying an undercoating ink such as white to a nail before printing a nail design in order to prevent a finish from being affected by a color of the nail when printing is performed on the nail of a finger,

SUMMARY

A printing apparatus of the present disclosure includes:

a print head that includes a plurality of nozzles ejecting a liquid agent performs printing on a print target; and at least one processor that controls an ejection operation of the print head based on ejection specification data defining ejection of the liquid agent.

At least a first mode and a second mode are provided with respect to application of the ejection specification data, and the processor switches between the first mode and the second mode based on a set printing density.

BRIEF DESCRIPTION OF THE DRAWINGS

FIGS. 9A to 9C are explanatory views illustrating ejection control when a common mask pattern is used, in which FIG. 9A illustrates a case of a head A, FIG. 9B illustrates a case of a head B, and FIG. 9C illustrates a case of a head C;

FIG. 23 is a view illustrating an example of a transparent effect table;

FIG. 24 is a view illustrating an example of a design association table;

FIG. 25 is a view illustrating an example of an occasion association table; and FIG. 26 is a view illustrating an example of a nail color density determination table.

DETAILED DESCRIPTION

An embodiment of a printing apparatus, a printing control method, and recording medium storing a program according to the present disclosure will be described with reference to FIGS. 1 to 26.

Although various technically preferable limitations are given to the embodiment described later in order to carry out the present disclosure, a scope of the present disclosure is not limited to the following embodiment and illustrated examples.

The printing apparatus of the present embodiment ejects an ink to a print target area to perform printing, and performs nail printing, for example, using a nail of a finger of a hand as a print target and a predetermined area of the nail according to a nail design as the print target area.

Note that the printing apparatus according to the present disclosure may use an object other than those illustrated herein as the print target, and a nail of a toe, for example, may be used as the print target. In addition, a nail-like object other than a human nail, such as surfaces of nail tips or various accessories, various sheets, seals, and the like may be used as the print target.

Figure 1:
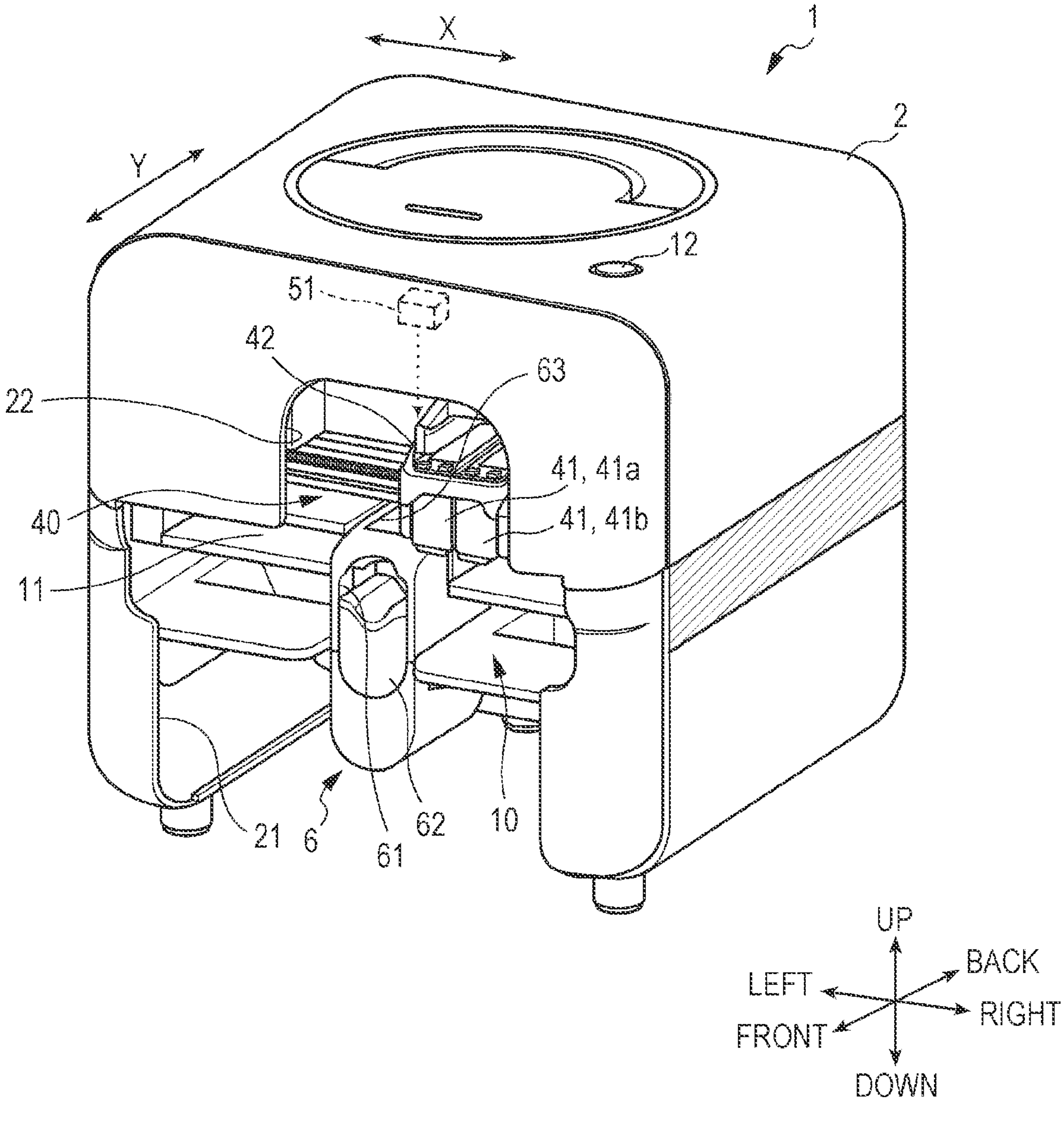
FIG. 1 is a view illustrating a schematic configuration of a printing apparatus in the present embodiment.
Figure 2:
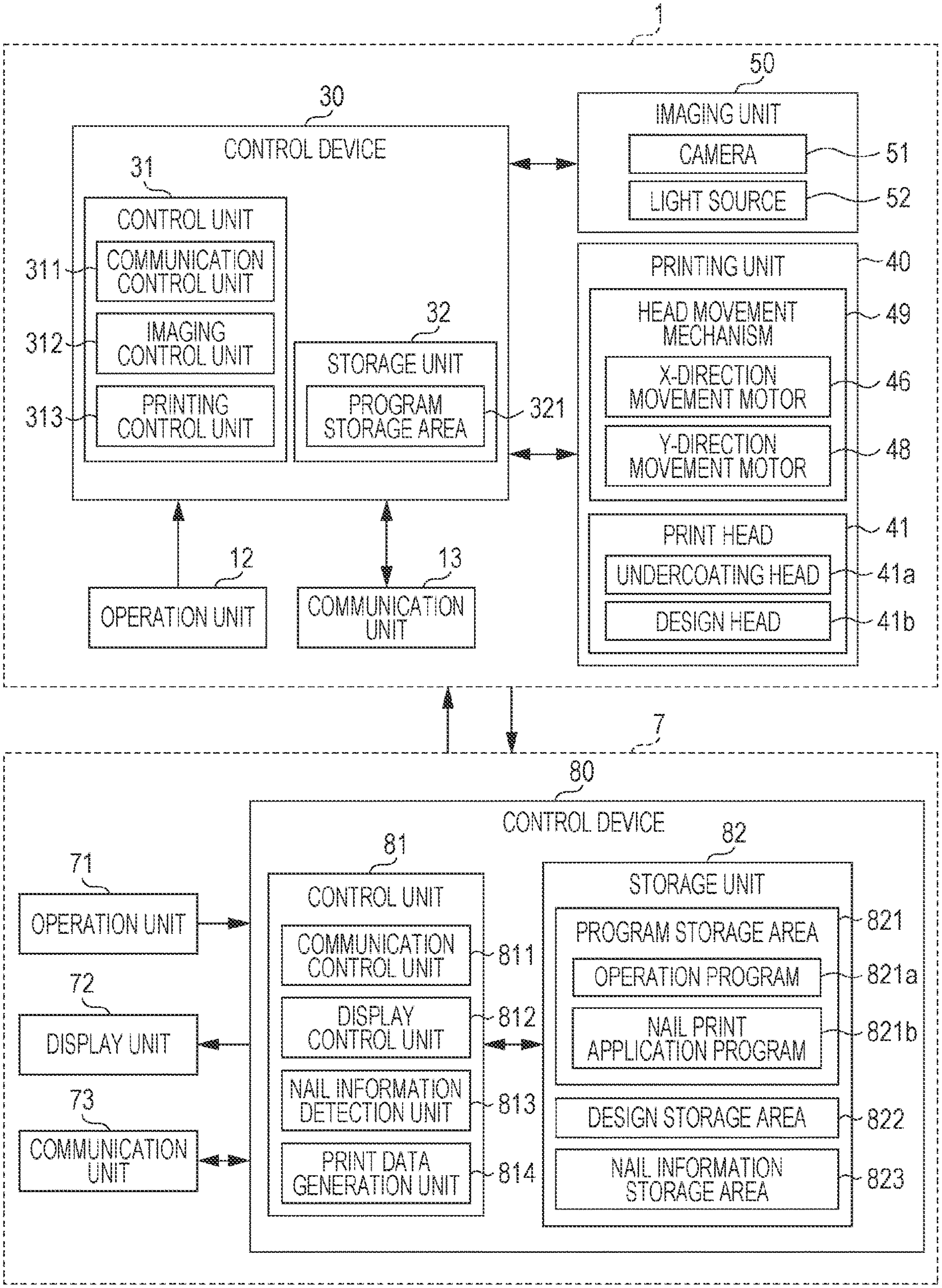
FIG. 2 is a block diagram of main parts illustrating a control configuration of the printing apparatus and a terminal device cooperating with the printing apparatus in the present embodiment.

FIG. 1 is a perspective view illustrating an external configuration of main parts of the printing apparatus according to the present disclosure. FIG. 2 is a block diagram illustrating a control configuration of the main parts of the printing apparatus according to the present embodiment.

In the following embodiment, up and down, left and right, and front and back refer to directions illustrated in FIG. 1. In addition, an X direction and a Y direction refer to directions illustrated in FIG. 1. The X direction is a main scanning direction, and the Y direction is a sub-scanning direction.

As illustrated in FIG. 2, a printing apparatus 1 of the present embodiment is configured to be capable of communicating with an external terminal device (a terminal device 7 in FIG. 2) to cooperate with each other.

As illustrated in FIG. 1, the printing apparatus 1 has a housing 2 formed in a substantially box shape.

The housing 2 has an opening 21 formed over substantially the entire surface in the left-right direction (the lateral direction of the printing apparatus 1, the left-right direction in FIG. 1, and the X direction) in a lower portion on the front surface side (the front side of the printing apparatus 1 and the front side in FIG. 1). In addition, a notch 22 is continuously formed on the upper side of the opening 21 substantially at the center of the housing 2 in the left-right direction. The notch 22 functions as an entrance when a print head 41, which will be described later, is attached to and detached from the apparatus.

An operation unit 12 of the printing apparatus 1 is provided on an upper surface (top plate) of the housing 2. The operation unit 12 is, for example, an operation button (power switch button) configured to turn on/off the power of the printing apparatus 1. When the operation unit 12 is operated, an operation signal is output to a control device 30, and the control device 30 performs control according to the operation signal to operate each unit of the printing apparatus 1. For example, in a case where the operation unit 12 is a power switch button, the power of the printing apparatus 1 is turned on/off according to the button operation.

Note that each unit of the printing apparatus 1 may operate according to an operation signal input from an operation unit 71 of the terminal device 7, which will be described later, instead of the operation unit 12 or in addition to the operation unit 12.

An external configuration of the printing apparatus 1, a shape of each portion of the housing 2, an arrangement of each portion, and the like are not limited to the illustrated example, and can be appropriately set. For example, the operation unit 12 may be provided on a side surface, a back surface, or the like of the housing 2, instead of the upper surface. In addition, the housing 2 may be provided with other various operation buttons as the operation unit 12, or may be provided with various display units, indicators, and the like.

An apparatus body 10 is accommodated in the housing 2.

The apparatus body 10 includes a base 11, a finger holder 6 attached thereto, a printing unit 40, and the like.

The finger holder 6 is arranged substantially at the center of the base 11 in the left-right direction (X direction) on the apparatus front surface side, and holds a finger (not illustrated) having a nail, which is the print target in the present embodiment, at a position suitable for printing.

As illustrated in FIG. 1, the finger holder 6 has an opening 61 on the apparatus front surface side. In addition, a finger placement member 62 is provided inside the finger holder 6. The finger placement member 62 pushes up and supports the finger inserted through the opening 61 from below, and is made of, for example, a flexible resin or the like.

On an upper surface on the back side (apparatus rear side) of the finger holder 6, a window portion (not illustrated) is formed to expose a nail portion of a finger inserted from the opening 61 and held by the finger placement member 62. In addition, a nail placement portion (not illustrated) on which a distal portion of the nail is placed is provided inside the finger holder 6. An upper surface of the finger holder 6 closer to the front side (apparatus front side) than a window portion 63 serves as a finger presser (not illustrated) that regulates an upper surface position of the finger.

The finger inserted into the finger holder 6 is held in the state of being arranged at an appropriate position suitable for printing by the print head 41 as a nail tip is placed on the nail placement portion and the upper surface of the finger is regulated by the finger presser.

The printing unit 40 performs printing on the print target area (nail) in accordance with print data generated by a print data generation unit 814 to be described later (a control unit 81 of the terminal device 7 to be described later, see FIG. 2).

The printing unit 40 includes a print head 41 (see FIG. 1) that is held by a holder 42 and performs a printing operation, a head movement mechanism 49 (see FIG. 2) configured to move the print head 41 and the holder 42 that holds the print head 41, and the like.

Figure 9A:
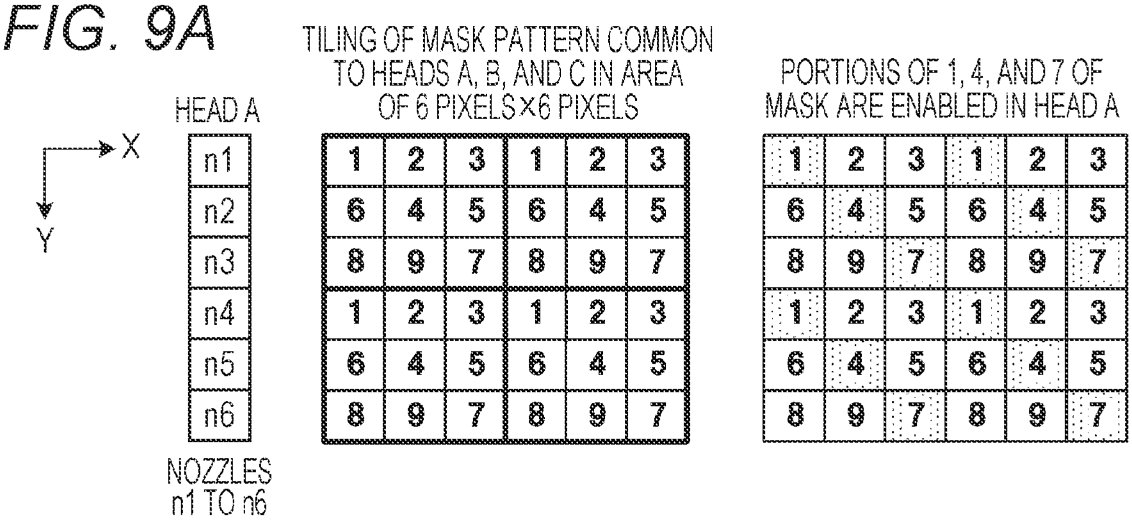
Figure 9B:
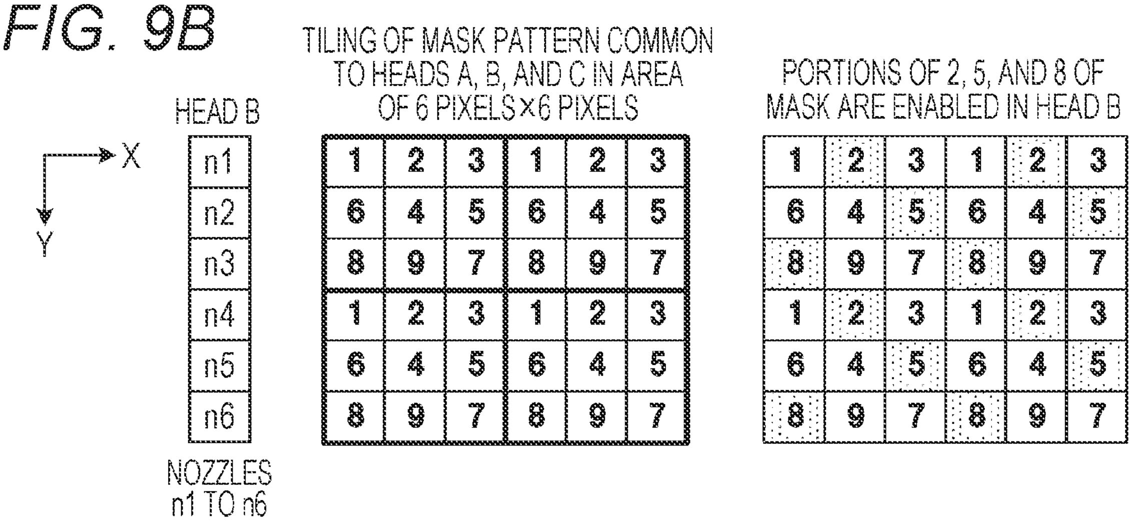
Figure 9C:
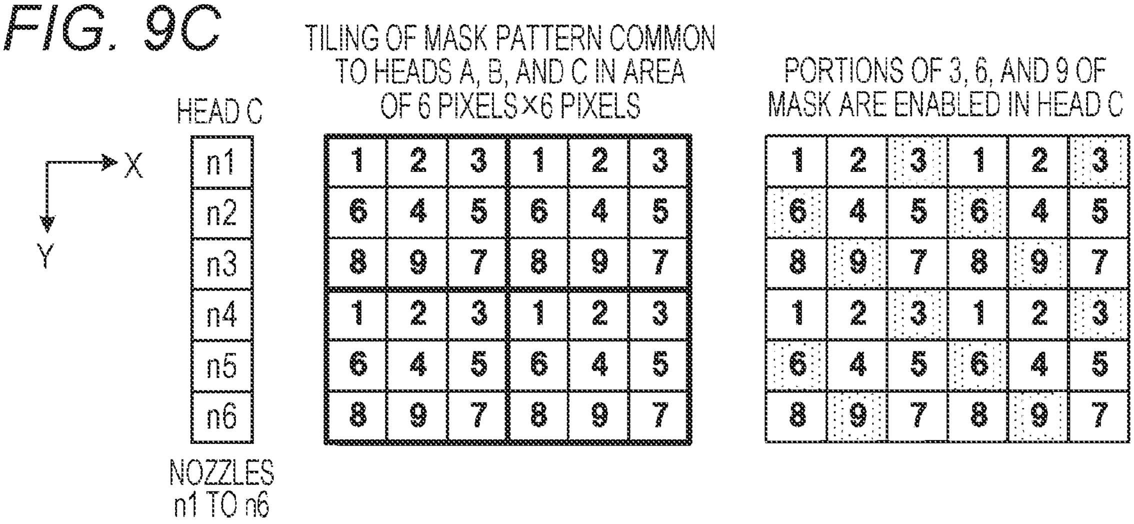

The print head 41 includes a plurality of nozzles (for example, six nozzles of nozzles n1 to n6 are illustrated in FIGS. 9A to 9C and the like for convenience) ejecting a liquid agent (an "ink" in the following embodiment), and performs printing on the nail as the print target held by the finger holder 6.

In the present embodiment, an undercoating head 41*a* and a design head 41*b* are mounted as the print head 41. Hereinafter, both the undercoating head 41*a* and the design head 41*b* are included in the case of being simply referred to as the "print head 41". Note that arrangements and the like of the undercoating head 41*a* and the design head 41*b* are not limited to the illustrated example.

Before printing a design, the undercoating head 41*a* prints a liquid agent (hereinafter, referred to as an "undercoating ink") which is an undercoating in the print target area (an inner area of a boundary line detected as a nail contour in the present embodiment) where the design is to be printed. The undercoating ink printed by the undercoating head 41*a* is preferably a liquid agent having a white color or a color close thereto such that color development of an ink is improved at the time of printing the design.

The design head 41*b* prints the design on the print target area where the undercoating has been printed after the undercoating printing performed by the undercoating head 41*a*, and can eject inks of the respective colors, for example, cyan (C: cyan), magenta (M: magenta), yellow (Y: yellow) and the like (hereinafter, referred to as "color inks"). Note that a type of a color ink that can be ejected by the design head 41*b* is not limited thereto, and inks of other colors may be ejected.

In the present embodiment, both the undercoating head 41*a* and the design head 41*b* are ink jet heads of an ink jet system in which a surface facing a nail surface is an ink ejection surface (not illustrated) including a plurality of nozzles (for example, nozzle 1 to 6 of FIG. 9A and the like) for ejecting inks, and printing is performed by atomizing an ink and directly spraying the ink from the ink ejection surface to the nail surface that is the print target surface of the print target (nail).

In the present embodiment, a case where a plurality of undercoating heads (a head A, a head B, and a head C in FIGS. 5A to 5C and the like) are provided will be exemplified.

Here, regarding the "plurality", a plurality of independent heads, such as the "undercoating head 41*a*" illustrated in FIG. 1, may be provided, or a plurality of head functional units (ejection functional units including nozzles) may be installed in one head as a cartridge which is set as the "undercoating head 41*a*" in FIG. 1, for example.

When a multi-head system in which an ink is ejected (sprayed) simultaneously by the plurality of heads (for example, the head A, the head B, and the head C), it is possible to reduce the number of scans in a case of overcoating an undercoating ink, for example, and to shorten printing time.

The head movement mechanism 49 moves the print head 41, and includes an X-direction movement mechanism (not illustrated) configured to move the print head 41 in the left-right direction (X direction) of the apparatus which is the main scanning direction and a Y-direction movement mechanism (not illustrated) configured to move the print head 41 in the front-back direction (Y direction) of the apparatus which is the sub-scanning direction.

The X-direction movement mechanism includes an X-direction movement motor 46, and drives the X-direction movement motor 46 to move the print head 41 in the left-right direction (X-direction) of the apparatus. In addition, the Y-direction movement mechanism includes a Y-direction movement motor 48, and drives the Y-direction movement motor 48 to move the print head 41 in the front-back direction (Y-direction) of the apparatus.

Operations of the X-direction movement motor 46, the Y-direction movement motor 48, and the print head 41 of the head movement mechanism 49 are controlled by a printing control unit 313 (see FIG. 2) of the control device 30.

In addition, an imaging unit 50, configured to image a nail (a finger including the nail) exposed from the window portion and acquire an image of the nail (an image of the finger including the nail, hereinafter referred to as a "nail image") is provided inside the upper surface (top plate) of the housing 2 at a position above the window portion of the finger holder 6.

The imaging unit 50 includes, for example, a camera 51 and a light source 52 including a white LED or the like that illuminates a nail to be imaged (see FIG. 2).

The imaging unit 50 is connected to an imaging control unit 312 (see FIG. 2) of the control device 30 to be described later, and is controlled by the imaging control unit 312.

The nail image imaged by the camera 51 is acquired by the imaging control unit 312 and appropriately transmitted to the cooperating terminal device 7.

Note that image data of the image captured by the imaging unit 50 may be stored in a storage unit 32 to be described later.

Although the case where the camera 51 and the light source 52 are fixedly arranged at positions that can face the nail of the finger (the surface of the nail) placed on the finger holder 6 or the surface of the adjustment paper P inside the top surface of the housing 2 is illustrated in the present embodiment, it suffices that the imaging unit 50 is provided at a position where the nail of the finger placed on the finger holder 6 can be imaged, and a specific arrangement thereof is not particularly limited.

For example, the imaging unit 50 may be configured to be movable in the XY directions by the head movement mechanism 49 that moves the print head 41.

The control device 30 installed on the printing apparatus 1 is a computer that includes a control unit 31 (see FIG. 2) configured using a processor such as a central processing unit (CPU) (not illustrated), and the storage unit 32 (see FIG. 2) including a read only memory (ROM), a random access memory (RAM), and the like (none of which are illustrated).

The storage unit 32 has a program storage area 321 in which various programs and the like for operating the printing apparatus 1 are stored. The program storage area 321 stores various programs such as a print program for performing a printing process, and the respective units of the printing apparatus 1 are integrally controlled as the control unit 31 develops these programs in, for example, a work area of the RAM and the control unit 31 executes the programs.

The control unit 31 includes a communication control unit 311, the imaging control unit 312, the printing control unit 313, and the like in terms of functions. The functions of the communication control unit 311, the imaging control unit 312, the printing control unit 313, and the like are realized by cooperation between the control unit 31 and the programs stored in the program storage area 321 of the storage unit 32.

The communication control unit 311 controls an operation of a communication unit 13.

The communication unit 13 includes a wireless communication module and the like that can communicate with a communication unit 73 of the terminal device 7, and the communication control unit 311 controls the operation of the communication unit 13 when various types of data and the like are transmitted and received between the printing apparatus 1 and the terminal device 7.

The printing apparatus 1 of the present embodiment is configured to print a nail design (hereinafter, also simply referred to as "design") in cooperation with the terminal device 7 to be described later. For example, data of the design to be printed on the nail is stored on the terminal device 7 side, and the communication control unit 311 appropriately controls communication performed by the communication unit 13 and acquires the data of the design from the terminal device 7 side via the communication unit 13.

As will be described later, an image acquired by the imaging unit 50 of the printing apparatus 1 is appropriately transmitted to the terminal device 7, and the control unit 81 (a nail information detection unit 813 to be described later) of the terminal device 7 detects various types of nail information based on the captured image. In the present embodiment, the control unit 81 (a print data generation unit 814 to be described later) of the terminal device 7 generates print data based on the nail information. Various pieces of information detected on the terminal device 7 side, the generated print data, and the like are transmitted from the terminal device 7 to the printing apparatus 1 via the communication units 13 and 73.

The communication between the printing apparatus 1 and the terminal device 7 may use a network line such as the Internet, or may perform wireless communication based on a short-range wireless communication standard such as Bluetooth (registered trademark) and Wi-Fi. When communication is performed via a network, any line may be used as the network used for communication. In addition, the communication between the printing apparatus 1 and the terminal device 7 is not limited to wireless communication, and a configuration in which various types of data can be transmitted and received between the printing apparatus 1 and the terminal device 7 by wired connection may be adopted.

Note that it suffices that the communication unit 13 can communicate with the terminal device 7, and one that conforms to a communication standard of the communication unit 73 of the terminal device 7 is applied.

The imaging control unit 312 controls the camera 51 and the light source 52 of the imaging unit 50 to cause the camera 51 to capture an image of a finger (nail image) including an image of a nail of the finger placed on the finger holder 6.

The image of the nail (nail image) acquired by the imaging unit 50 is transmitted to the imaging control unit 312, and the imaging control unit 312 acquires data of the nail image. Note that the imaging control unit 312 may store the nail image in the storage unit 32.

The printing control unit 313 controls the printing unit 40 to perform printing on a print target area (an inner area of a nail contour or the like) of a nail as a print target according to print data generated by the print data generation unit 814 to be described later.

Specifically, the printing control unit 313 outputs a control signal to the printing unit 40 based on the print data, and ejects an ink by any one of the plurality of nozzles (nozzles n1 to n6 in the illustrated example) of the print head 41 with respect to each position of the print target area corresponding to the nail as the print target while moving the print head 41 by the X-direction movement motor 46 and the Y-direction movement motor 48, thereby performing control to perform printing on the print target area.

In particular, the printing control unit 313 of the present embodiment controls the ejection operation of the print head 41 that includes the plurality of nozzles ejecting a liquid agent (ink) and performs printing on the nail as the print target based on "ejection specification data" that defines the ejection of the liquid agent (ink). Furthermore, in the present embodiment, at least a "first mode" and a "second mode" are prepared with respect to the application of the "ejection specification data", and the printing control unit 313 switches between the "first mode" and the "second mode" based on a "set ejection amount". Note that details of head ejection control performed by the printing control unit 313 will be described later.

As described above, the printing apparatus 1 of the present embodiment performs printing on the nail in cooperation with the terminal device 7.

The terminal device 7 is, for example, a mobile terminal device such as a smartphone. Note that the terminal device 7 is not limited to the smartphone. For example, the terminal device 7 may be a tablet personal computer (hereinafter, referred to as "PC"), a notebook PC, a stationary PC, a terminal device for a game, or the like.

As illustrated in FIG. 2, the terminal device 7 includes an operation unit 71, a display unit 72, a communication unit 73, a control device 80, and the like.

The operation unit 71 is configured to enable various inputs, settings, and the like according to user's operations, and is, for example, a touch panel integrally provided on the surface of the display unit 72. When the operation unit 71 is operated, an input signal corresponding to the operation is transmitted to the control unit 81.

Various operation screens are displayed on the touch panel configured by the display unit 72 under control of a display control unit 812, which will be described later, and the user can perform various operations such as inputs and settings by a touch operation on the touch panel.

Note that the operation unit 71 configured to perform various operations such as inputs and settings is not limited to the touch panel. For example, various operation buttons, a keyboard, a pointing device, or the like may be provided as the operation unit 71.

In the present embodiment, various instructions such as printing start are output from the terminal device 7 to the printing apparatus 1 as the user operates the operation unit 71, so that the terminal device 7 also functions as an operation unit of the printing apparatus 1.

In addition, the user can select the nail design (design) to be printed on the nail by operating the operation unit 71.

The display unit 72 is configured using, for example, a liquid crystal display (LCD), an organic electroluminescence display, or another flat display.

As described above, a touch panel configured to perform various inputs may be integrally formed on the surface of the display unit 72. In this case, the touch panel functions as the operation unit 71.

In the present embodiment, the nail design input and selected by the user from the operation unit 71, various guidance screens, a warning display screen, and the like can be displayed on the display unit 72.

The communication unit 73 is configured to be capable of communicating with the communication unit 13 of the printing apparatus 1.

As described above, the communication between the printing apparatus 1 and the terminal device 7 may adopt either a wireless connection system or a wired connection system, and a specific system thereof is not limited. It suffices that the communication unit 73 can communicate with the printing apparatus 1, and one that conforms to a communication standard of the communication unit 13 of the printing apparatus 1 is applied.

The communication unit 73 is connected to a communication control unit 811 (see FIG. 2) of the control device 80, which will be described later, and is controlled by the communication control unit 811.

As illustrated in FIG. 2, the control device 80 of the terminal device 7 of the present embodiment is a computer including the control unit 81 configured using at least one processor such as a central processing unit (CPU) (not illustrated), and at least one storage unit 82 as a memory configured using a read only memory (ROM), a random access memory (RAM), and the like (not illustrated).

The storage unit 82 stores various programs, various types of data, and the like to operate the respective units of the terminal device 7.

Specifically, the ROM or the like of the present embodiment stores not only an operation program 821*a* for integrally controlling the respective units of the terminal device 7 but also various programs such as a nail print application program 821*b* (hereinafter referred to as "nail print AP") for performing nail printing using the printing apparatus 1. Thus, the control unit 81 develops these programs in, for example, a work area of the RAM, and the respective units of the terminal device 7 are integrally controlled as the programs are executed by the control unit 81.

In addition, the storage unit 82 of the present embodiment is provided with a design storage area 822 for storing data of the nail design (design), a nail information storage area 823, and the like. The nail information storage area 823 stores various types of information regarding the nail detected by the nail information detection unit 813 to be described later.

Note that the nail design (design) stored in the design storage area 822 may be an existing design prepared in advance or a design created directly by the user. In addition, when the terminal device 7 can be connected to various networks, it may be configured such that a nail design (design), stored in a server device (not illustrated) or the like connectable to the network, can be acquired.

The control unit 81 of the terminal device 7 includes the communication control unit 811, the display control unit 812, the nail information detection unit 813, the print data generation unit 814, and the like in terms of functions. The functions as the communication control unit 811, the display control unit 812, the nail information detection unit 813, the print data generation unit 814, and the like are realized by cooperation between the CPU of the control unit 81 and the programs stored in the ROM of the storage unit 82. Note that the functions of the control unit 81 of the terminal device 7 are not limited thereto, and may include other various functional units.

The communication control unit 811 controls the operation of the communication unit 73.

In addition, the display control unit 812 controls the display unit 72 to display various display screens on the display unit 72.

The nail information detection unit 813 detects nail information on a nail based on an image of the nail (nail image) acquired by the imaging control unit 312 of the printing apparatus 1. In the present embodiment, the nail information detection unit 813 detects contour information of the nail (nail contour) defining an area of the nail as the nail information. An inner area of the nail contour detected by the nail information detection unit 813 is a print target area to be printed by the printing apparatus 1.

Note that the nail information detected by the nail information detection unit 813 is not limited thereto.

Examples of the nail information detected by the nail information detection unit 813 may include an inclination angle (a nail inclination angle and a nail curvature) of a surface of a nail with respect to the XY plane. In addition, in a case where a height of the nail (a position of the nail in the vertical direction) can be acquired from an image or the like imaged by the camera 51, the height of the nail may also be included in the nail information.

Various pieces of information detected by the nail information detection unit 813 are stored in the nail information storage area 823. In the present embodiment, various types of information detected by the nail information detection unit 813 may be sent to the printing apparatus 1. Note that various processes based on the nail information may be performed on the printing apparatus 1 side.

The print data generation unit 814 generates print data by aligning a desired design with a nail area detected by the nail information detection unit 813.

For example, the print data generation unit 814 cuts out image data of the nail design (design) selected by the user and appropriately performs scaling, arrangement adjustment, and the like to perform fitting in the nail area detected from the nail image, thereby generating print data for design. In a case where the nail information detected by the nail information detection unit 813 includes an inclination angle of the nail, a nail curvature, and the like, curved surface correction and the like may be appropriately performed according to these pieces of information.

Next, an operation of the printing apparatus 1 of the present embodiment will be described.

Figure 3:
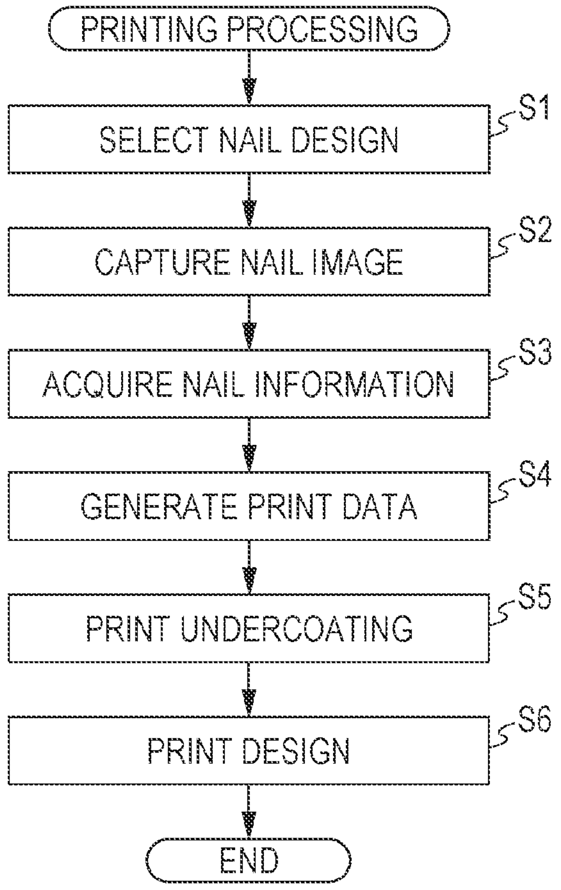
FIG. 3 is a flowchart illustrating a flow of printing processing in the printing apparatus of FIG. 1.

FIG. 3 is a flowchart illustrating a flow of printing processing executed by the printing apparatus 1. The printing processing illustrated in FIG. 3 is executed, for example, by cooperation of the control unit 31 illustrated in FIG. 2 and the programs stored in the program storage area 321 of the storage unit 32 when the power of the printing apparatus 1 is turned on.

First, the control unit 31 causes the terminal device 7 to allow the user to select a nail design to be printed on a nail as a print target (step S1).

For example, the control unit 31 instructs the communication control unit 311 to display a nail design selection screen to the terminal device 7 via the communication unit 13. When the communication unit 73 receives a nail design selection instruction from the printing apparatus 1, the terminal device 7 causes the display control unit 812 to display the nail design selection screen stored in the design storage area 822 on the display unit 72. When the user selects a nail design by operating the operation unit 71, image data of the selected nail design is read from the design storage area 822 to the RAM.

Next, the control unit 31 causes the finger holder 6 to place a finger corresponding to the nail as the print target, and causes the imaging unit 50 to perform imaging by the imaging control unit 312 to acquire a nail image (step S2).

For example, the control unit 31 instructs the communication control unit 311 to display a notification screen prompting the terminal device 7 to set the finger corresponding to the nail as the print target on the finger holder 6 using the communication unit 13. When the terminal device 7 receives the instruction from the printing apparatus 1 using the communication unit 73, the display control unit 812 causes the display unit 72 to display a notification screen prompting an instruction to start printing by setting the finger corresponding to the nail as the print target on the finger holder 6. When the start of printing is instructed by the operation unit 71, the communication control unit 811 of the control unit 81 transmits a printing start instruction to the printing apparatus 1 using the communication unit 73.

In the printing apparatus 1, when the finger is placed on the finger holder 6 and the communication unit 13 receives the printing start instruction, the control unit 31 causes the imaging unit 50 to perform imaging by the imaging control unit 312 to acquire the nail image.

Next, the control unit 31 causes the communication control unit 311 to transmit image data of the nail image acquired by the imaging unit 50 to the terminal device 7 using the communication unit 13, causes the terminal device 7 to acquire nail information from the nail image (step S3), and instructs generation of print data (step S4).

When the communication unit 73 receives the nail image from the printing apparatus 1, the terminal device 7 causes the nail information detection unit 813 of the control unit 81 to detect a contour shape (nail contour) of the nail from the nail image, and sets an inner area of the nail contour as a nail area. Then, the print data generation unit 814 generates the print data based on the acquired nail information (nail contour or the like).

Specifically, the print data generation unit 814 cuts out the image data of the nail design in accordance with the contour shape of the nail as the print target, appropriately performs scaling and the like, specifies a print target area corresponding to the nail as the print target, and generates print data for design indicating a color to be ejected to each position (each pixel position) of the print target area. Note that the nail design may be set to perform printing on the entire nail, and in this case, the print target area is equal to the inner area of the nail contour. In addition, the nail design may be set to perform printing on a part of the nail such as a French nail. In this case, the print target area is a nail design area adapted to the nail. In addition, the print data generation unit 814 generates print data for undercoating to instruct printing with an undercoating ink for the entire print target area.

The communication control unit 811 causes the print data generated by the print data generation unit 814 to be transmitted to the printing apparatus 1 via the communication unit 73.

In the printing apparatus 1, when the communication unit 13 receives the print data, the control unit 31 controls the printing control unit 313 to control the X-direction movement motor 46, the Y-direction movement motor 48, and the undercoating head 41*a* based on the print data for undercoating, thereby performing undercoating printing on the print target area of the nail as the print target placed on the finger holder 6 (step S5).

Next, the control unit 31 controls the printing control unit 313 to control the X-direction movement motor 46, the Y-direction movement motor 48, and the design head 41*b* based on the print data for design, causes the nail design to be printed on the print target area of the nail as the print target placed on the finger holder 6 (step S6), and ends the printing processing.

Here, the undercoating ink is preferably overcoated to increase a printing density in the undercoating printing in step S5 in order to ensure the concealability of an undercoating. Note that the printing density is defined by an ejection amount (application amount) of a liquid agent (ink) from the print head 41 (undercoating head 41*a*), but there is a limit to the amount of the ink that can be overcoated (that can be received on a nail surface) depending on a type of a device and the liquid agent. For example, when a printing density in a completion state of printing performed once for the entire printing area is set to 100%, a case where a density of 300% is set as an upper limit of the printing density is illustrated as an example in the present embodiment.

In the present embodiment, an ejection amount by which an ink having whiteness in a reference range is ejected once to the entire print target area is set to an ejection amount of the printing density of 100%. Thus, the printing density of 300% means a density achieved by the ejection amount by which the ink is ejected three times to the entire print target area. The "whiteness in the reference range" refers to the degree of density of white in a case where white components contained in the ink are in a stable dispersion state.

In the present embodiment, in order to reduce the number of scans for overcoating, a plurality of heads (the three heads of the head A, the head B, and the head C in the embodiment) are prepared as the undercoating head 41*a* as described above to perform the undercoating printing with the multi-head system.

Figure 4:
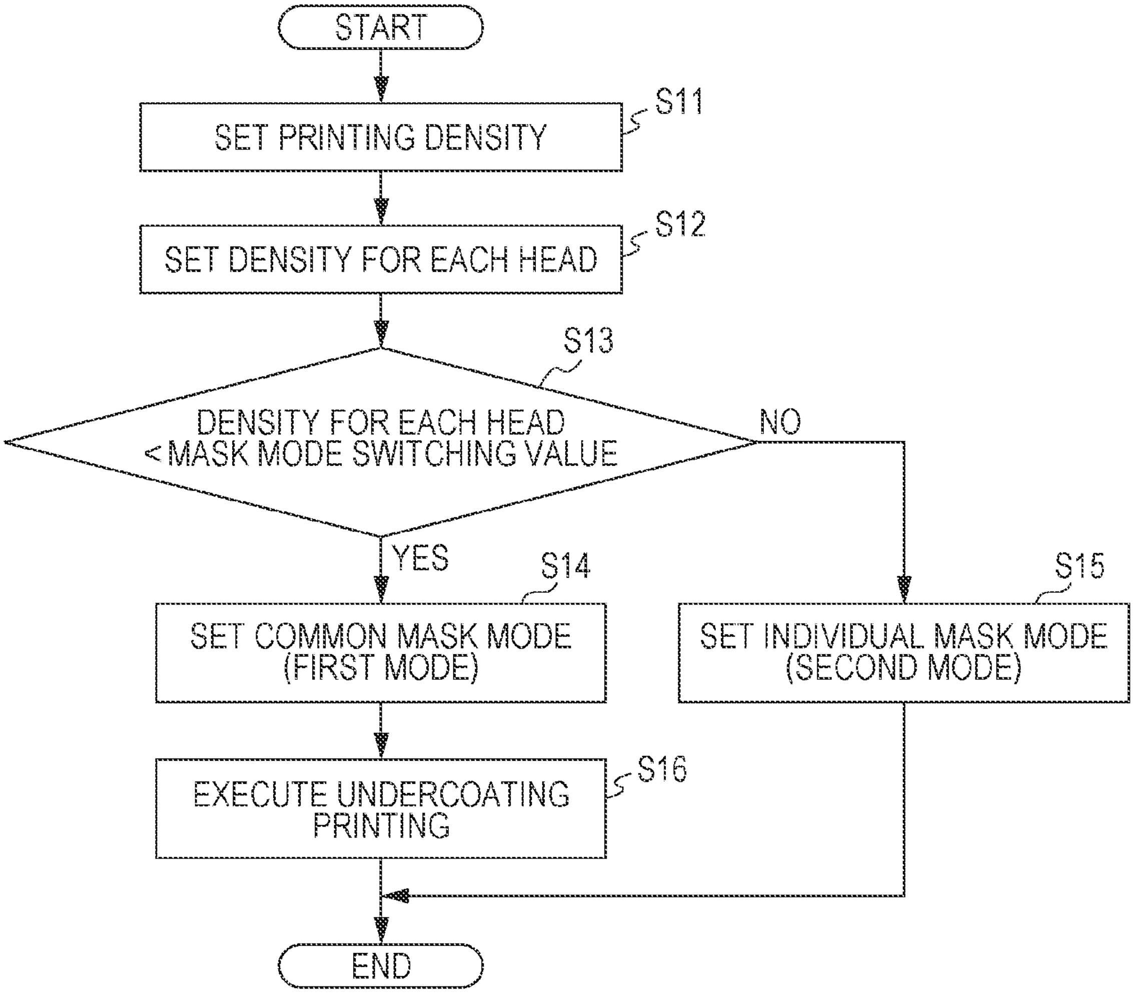
FIG. 4 is a flowchart illustrating a flow of mask mode switching processing.

FIG. 4 illustrates an outline of undercoating printing processing in the present embodiment.

First, a density (printing density) that is desired to be achieved in printing is set (step S11). The printing density, that is, a density required for an undercoating differs in relation to a finish condition and the like when color printing (that is, printing of a design by the design head 41*b*) is performed. In addition, a color and the like of a nail (natural nail or ground nail) to which the undercoating is applied may be considered in setting of the printing density. The printing density may be automatically set to a default value by selecting a type (mode) of printing, for example, "undercoating printing". Alternatively, the user may input and set a preferred density.

In general, an undercoating ink such as a white ink has low concealability, and in a case where the undercoating ink is applied by an ink jet system, it is sometimes difficult to obtain sufficient concealability even if the entire surface printing at 100% is performed. Therefore, there is a case where printing is performed at a high density of 200% or 300% by performing overcoating a plurality of times in order to ensure a color developing property of a color ink. For example, in a case where it is desired to print a design with a colorful pattern, color development of color inks becomes better when an undercoating is printed at a sufficiently high density to enhance the concealability, and a design with a clear finish can be printed. In addition, when the concealability is high, it is not affected by the color of the natural nail or the like. On the other hand, an undercoating that allows the user to see a natural nail through the undercoating to some extent leads to a natural and transparent finish, and thus, an undercoating with a low density is sometimes preferable depending on a design.

Therefore, the printing density may be set in association with each design. In a case where the printing density has been determined in association with each design, if the design is selected, the printing density is also automatically set. In this case, the user may freely change a value set according to his/her preference or the like.

Next, the control unit 31 sets a "density for each head" based on a "set value of the printing density" (step S12).

In the present embodiment, a description will be given by exemplifying a case where the "set value of the printing density" required to form an undercoating with a desired density is equally shared by the three heads (the head A, the head B, and the head C in the embodiment).

In particular, in a case where one head as a cartridge includes a plurality of head functional units (ejection functional units including a nozzle), if there is a deviation in an ink remaining amount or the like between the head functional units, it is necessary to replace the entire cartridge when the ink remaining amount in some head functional units decreases, and cost performance deteriorates. In this regard, in the case where the required printing density is equally allocated to the respective heads (the head A, the head B, and the head C), there is no deviation in the ink remaining amount of each head, deterioration of each head due to the use is not biased, and maintainability is excellent, which is preferable.

A "set value of the density for each head" is a value obtained by dividing the set value of the printing density by the number of heads. For example, when the "set value of the printing density" is "270%", the "set value of the density for each head" is obtained as "90%" by dividing "270%" by three.

In the present embodiment, a "mask mode switching value", which is a threshold ("preset density threshold") related to the "set ejection amount", is stored in the storage unit 32 or the like, and the control unit 31 reads the "mask mode switching value" (a threshold of the "set ejection amount" or the "preset density threshold") and compares the "mask mode switching value" with the "set value of the density for each head" (step S13).

In the present embodiment, the control of the ejection operation of the print head 41 is performed based on the "ejection specification data" (shingling mask data for performing printing by dispersing nozzles that eject inks, and this is hereinafter also referred to as a "mask pattern") that defines whether to eject a liquid agent (ink) from the print head 41 to each position of the print target area (the inner area of the nail contour or the like) of the nail as the print target, and the present embodiment has at least the "first mode" and the "second mode" with respect to the application of the "ejection specification data" at the time of performing the undercoating printing.

In the “first mode”, ejection is controlled by applying a common “mask pattern” (“ejection specification data”) to all the heads (the head A, the head B, and the head C) that share the undercoating printing. Hereinafter, the “first mode” is also referred to as a “common mask mode” (see FIG. 4 and the like). On the other hand, in the “second mode”, ejection is controlled by applying different (individual) “mask patterns” (“ejection specification data”) respectively to the heads (the head A, the head B, and the head C) that share the undercoating printing. Hereinafter, the “second mode” is also referred to as an “individual mask mode” (see FIG. 4 and the like).

As will be described in detail later, the “first mode” (“common mask mode”) is effective in a case where the printing density (density for each head) is relatively low, and the “second mode” (“individual mask mode”) is effective in a case where the printing density (density for each head) is relatively high.

The “mask mode switching value” (the threshold of the “set ejection amount” or the “preset density threshold”) is a threshold for determining in which mode (mask mode) out of the “first mode” and the “second mode” printing is to be performed.

Although a degree of the “mask mode switching value” is an item that is appropriately set, the mask mode in which the “mask pattern” (“ejection specification data”) is applied is switched by setting, for example, a degree of “40%” and applying the “mask pattern” (“ejection specification data”) in the “first mode” (“common mask mode”) when the “set value of the density for each head” is lower than this or applying the “mask patterns” (“ejection specification data”) in the “second mode” (“individual mask mode”), for example, when the “set value of the density for each head” is higher than “40%”.

Although the case where the “mask mode switching value” (the threshold of the “set ejection amount” or the “preset density threshold”) is compared with the “set value of the density for each head” in the determination of switching of the mode for the application of the “mask pattern” (“ejection specification data”) has been exemplified in the description of FIG. 4 and the like, the “set value of the printing density” set in step S12 may be compared with the “mask mode switching value” (the threshold of the “set ejection amount” or the “preset density threshold”). In this case, the “mask mode switching value” (the threshold of the “set ejection amount” or the “preset density threshold”) to be compared is also changed to a value before being divided by the number of heads (“120%” in the above example) and used.

FIGS. 5A to 5D illustrate schematic explanatory views in a case where a “mask pattern” (“ejection specification data”) is applied in the “first mode” (“common mask mode”), and FIGS. 6A to 6D illustrate schematic explanatory views in a case where “mask patterns” (“ejection specification data”) are applied in the “second mode” (“individual mask mode”).

Figures 5A, 5B, 5C, 5D:
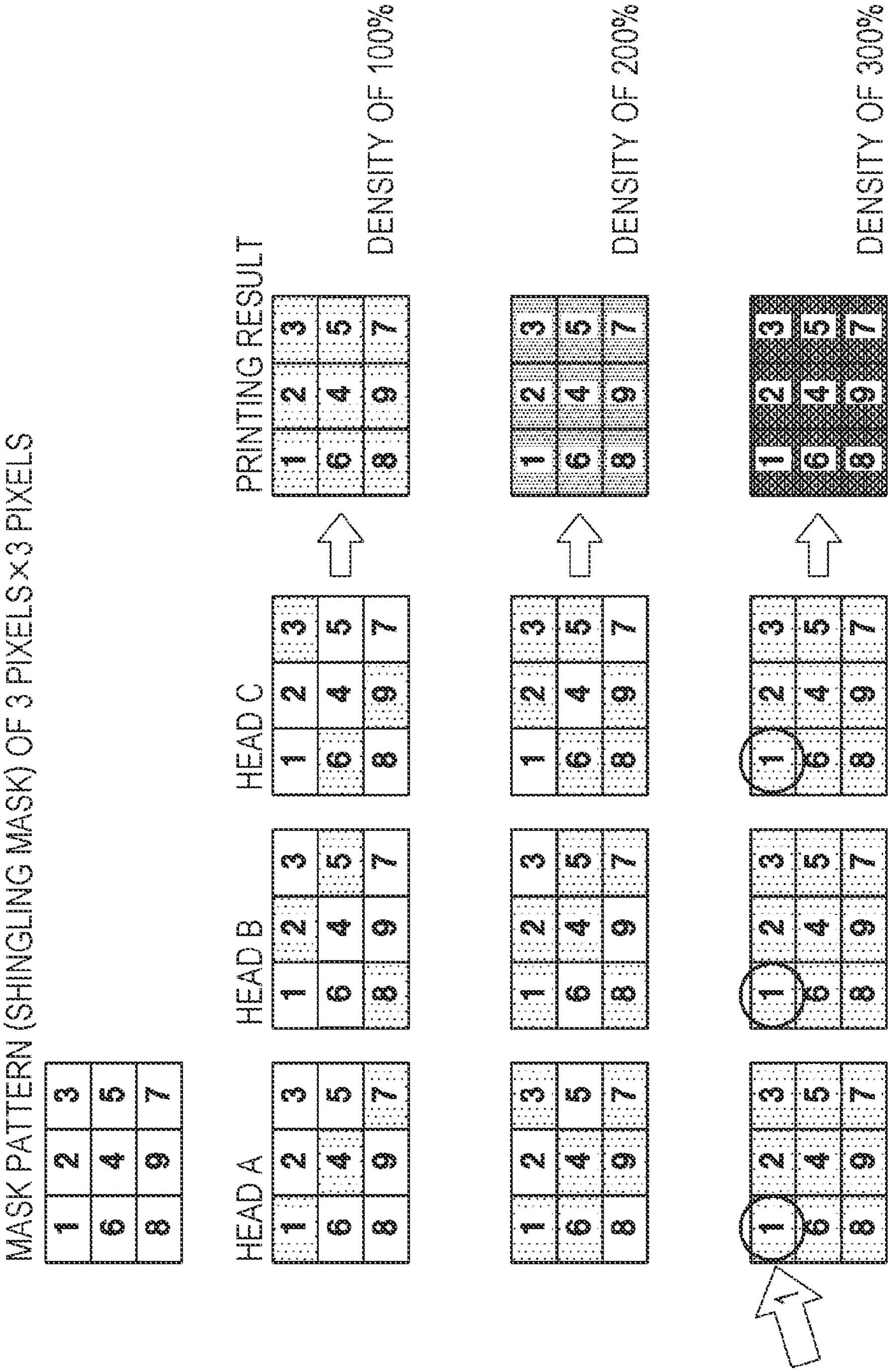
FIGS. 5A to 5D are explanatory views schematically illustrating print processing in a common mask mode.
Figures 6A, 6B, 6C, 6D:
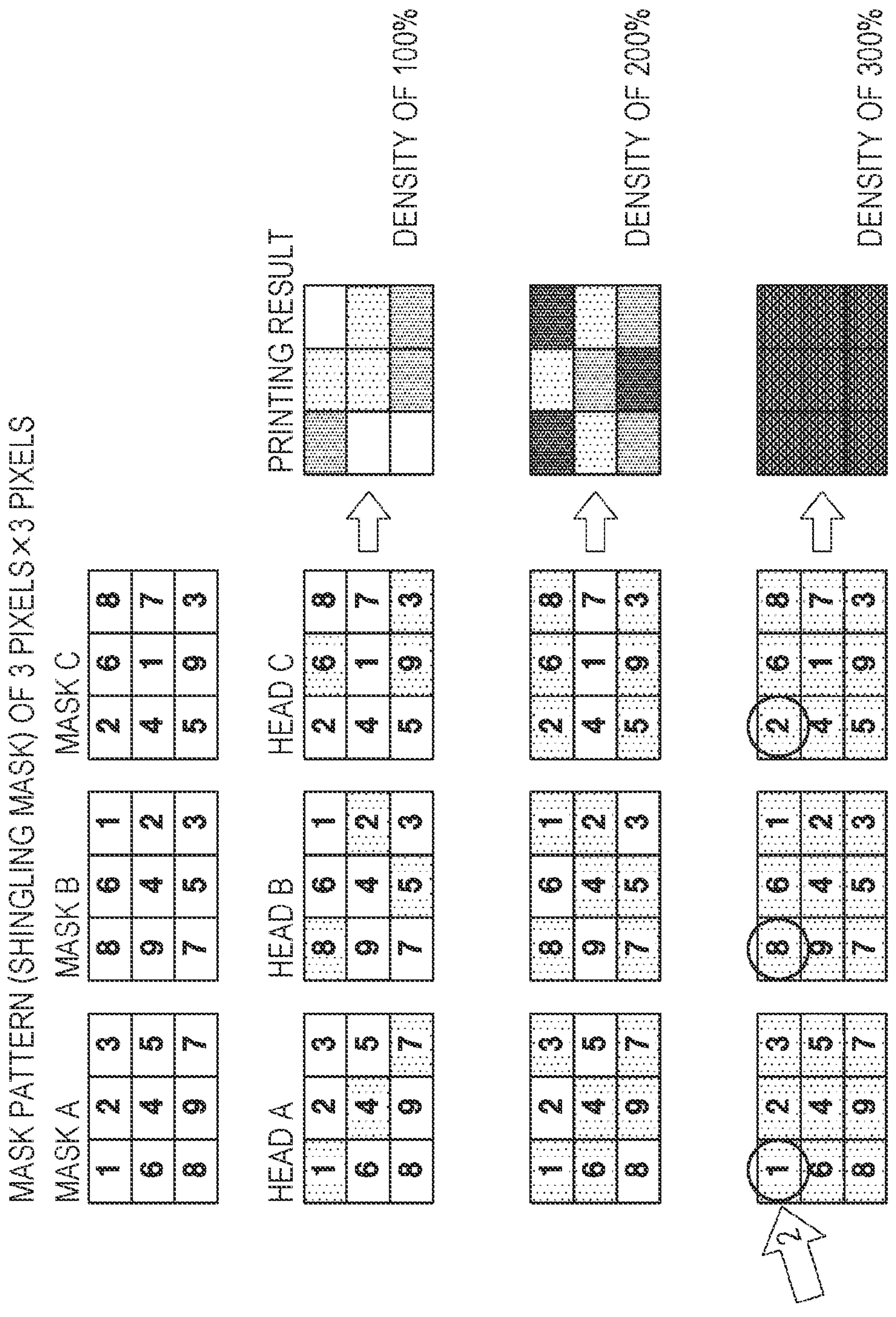
FIGS. 6A to 6D are explanatory views schematically illustrating printing processing in an individual mask mode.

Note that FIGS. 5A and 6A illustrate examples of a mask pattern (shingling mask) of 3 pixels×3 pixels for convenience of the description. In addition, a numerical value in the mask pattern indicates a position of a pixel corresponding to a relevant portion, and is used as a threshold for determining to which pixel an ink is to be ejected or not to be ejected.

The “mask pattern” (shingling mask) is originally used to reduce banding noise or the like, and all thresholds (1 to 9 in the illustrated example) are equally arranged. For example, in the case of the mask of 3 pixels×3 pixels as in the examples illustrated in FIGS. 5A and 6A, the numbers from 1 to 9 (which are referred to as “mask thresholds”) are arranged in the mask pattern without omission or duplication. In addition, it is preferable to adopt an arrangement in which the same numerical value (“mask threshold”) is not continuous at adjacent positions. As a result, when ejection is controlled by applying the “mask pattern”, the ink ejection can be controlled to be performed in a dispersed manner, and a printing result with less roughness can be obtained.

A type of the mask is not particularly limited, but for example, a dither mask (a mask using the dither matrix, such as a blue noise mask or a green noise mask) or the like used for halftone processing by a dither method can be used as the “mask pattern” (shingling mask).

In the examples illustrated in FIGS. 5A to 5D and FIGS. 6A to 6D, the head A takes charge of pixels of the mask thresholds 1, 4, and 7 (that is, reference pixels originally scheduled to be in charge are the pixels of the mask thresholds 1, 4, and 7), the head B takes charge of pixels of the mask thresholds 2, 5, and 8 (that is, reference pixels originally scheduled to be in charge are the pixels of the mask thresholds 2, 5, and 8), and the head C takes charge of pixels of the mask thresholds 3, 6, and 9 (that is, reference pixels originally scheduled to be in charge are the pixels of the mask thresholds 3, 6, and 9). FIGS. 5B and 6B illustrate a case where the printing density is 0 to 100%, FIGS. 5C and 6C illustrate a case where the printing density is up to 200%, and FIGS. 5D and 6D illustrate a case where the printing density is up to 300%.

For example, when the “mask pattern” (“ejection specification data”) is applied in the “first mode” (“common mask mode”), ejection is controlled in the case where the printing density is 0 to 100% such that each of the heads performs printing on the reference pixels originally scheduled to be in charge by causing the head A to eject the ink to the pixels of 1, 4, and 7, causing the head B to eject the ink to the pixels of 2, 5, and 8, and causing the head C to eject the ink to the pixels of 3, 6, and 9 as illustrated in FIG. 5B. As a result, the inks are uniformly ejected once for all the pixels of 1, 2, 3, 4, 5, 6, 7, 8, and 9 by the three heads (the head A, the head B, and the head C).

In addition, in the case where the printing density is up to 200%, ejection is controlled such that the ink is ejected to the pixels of 3, 6, and 9 in the head A, the ink is ejected to the pixels of 1, 4, and 7 in the head B, and the ink is ejected to the pixels of 2, 5, and 8 in the head C as illustrated in FIG. 5C in addition to ejection positions (positions corresponding to the reference pixels of the respective heads) where the inks have been ejected in the case where the printing density is 0 to 100%. As a result, the inks are uniformly ejected twice for all the pixels of 1, 2, 3, 4, 5, 6, 7, 8, and 9 by the three heads (the head A, the head B, and the head C).

Furthermore, in the case where the printing density is up to 300%, ejection is controlled such that the ink is ejected to the pixels of 2, 5, and 8 in the head A, the ink is ejected to the pixels of 3, 6, and 9 in the head B, and the ink is ejected to the pixels of 1, 4, and 7 in the head C in addition to ejection positions (positions corresponding to the reference pixels of the respective heads) where the inks have been ejected in the case where the printing density is 0 to 100% and ejection positions where the inks have been ejected in the case where the printing density is up to 200%. As a result, the inks are uniformly ejected three times for all the pixels of 1, 2, 3, 4, 5, 6, 7, 8, and 9 by the three heads (the head A, the head B, and the head C).

In this manner, all the heads (the head A, the head B, and the head C) sharing the printing are subjected to the ejection control according to the same mask pattern in the case of the "first mode" ("common mask mode"), and thus, there is no omitted place where printing is not performed at all even when printing with a low density in which printing is performed only once as a whole and the printing density is 0 to 100% has been performed, and a printing result without roughness is obtained.

However, when printing with a high density of 300% as a whole has been performed by achieving 100% in each of all the heads, the inks are continuously ejected to the same pixel in all the heads (the head A, the head B, and the head C), for example, as in a portion indicated by an outlined arrow "1" in FIG. 5D. The head A, the head B, and the head C are arranged side by side in the X direction without much space. Therefore, if the inks are continuously ejected from the respective heads to the same pixel, for example, the ink has been ejected from the head A and landed on the nail as the print target, but the inks are ejected one after another from the subsequent head B and head C and land at the same position while the ink is not yet stabilized. Therefore, aggregation in which the inks stick to each other is likely to occur, and a problem that the ink that has landed earlier is pulled by the ink that lands later to be displaced from a position where the ink needs to originally be fixed occurs, so that there is a possibility that printing is disturbed and a high-quality printing result is not obtainable.

On the other hand, when the "mask patterns" ("ejection specification data") are applied in the "second mode" ("individual mask mode") as illustrated in FIGS. 6B to 6D, ejection is controlled such that Mask A is applied to eject the ink to pixels of the mask thresholds 1, 4, and 7 (reference pixels of the head A) in the head A, Mask B is applied to eject the ink to pixels of the mask thresholds 2, 5, and 8 (reference pixels of the head B) in the head B, and Mask C is applied to eject the ink to pixels of the mask thresholds 3, 6, and 9 (reference pixels of the head C) in the head C. In this manner, even if the ejection is controlled according to the mask pattern similarly to the case of FIGS. 5B to 5D, since the mask patterns applied to the respective heads (the head A, the head B, and the head C) are different, the inks are ejected to the same pixel in a duplicated manner in the respective heads (the head A, the head B, and the head C), or conversely, there is a pixel (non-landing pixel) on which the ink is not ejected from any of the heads.

This is particularly remarkable in the case where the printing density is as low as 0 to 100%, but printing on all the pixels is not yet uniform even in the case where the printing density is up to 200%.

Note that the "mask pattern" ("shingling mask") is tiled in a large range of about 256 pixels×256 pixels and used in actual printing, and the numbers from 1 to 9 ("mask thresholds") constituting the "mask pattern" are also neatly dispersed all over a print target area. Therefore, there is a low possibility that extreme duplication or continuous non-landing pixels occur as in the illustrated example, but there is a possibility that a rough printing result is obtained particularly at a low density.

However, in the case where the printing with the high density of 300% as a whole has been performed by achieving 100% in each of all the heads in the "second mode" ("individual mask mode"), the inks are ejected from the three heads (the head A, the head B, and the head C) at different timings, for example, as in a portion indicated by an outlined arrow "2" in FIG. 6D, so that printing failure such as the ink aggregation can be avoided. Details of a shift in the ejection timing of the ink landing at the same position in the case of the "second mode" ("individual mask mode") will be described later with reference to FIG. 18 and the like.

In this manner, the "first mode" ("common mask mode") is a mode that is effective in the case of printing at a low density where the printing density (density for each head) is relatively low, and the "second mode" ("individual mask mode") is a mode that is effective in the case of printing at a high density where the printing density (density for each head) is relatively high.

Therefore, the control unit 31 switches the mask mode according to a set value of the density required for printing (the printing density or the density for each head derived from the printing density) in the present embodiment so as to apply the "first mode" ("common mask mode") if the set value is a density lower than the "mask mode switching value" (the threshold of the "set ejection amount" or the "preset density threshold") or to apply the "second mode" ("individual mask mode") if the set value is a density higher than the "mask mode switching value" (the threshold of the "set ejection amount" or the "preset density threshold").

The "first mode" ("common mask mode") or the "second mode" ("individual mask mode") may be applied as handling when the "set value of the printing density" or the "set value of the density for each head" is exactly the same as the "mask mode switching value" (the threshold of the "set ejection amount" or the "preset density threshold").

First, a case where the "first mode" ("common mask mode") is applied to the ejection control of the print head 41 (the head A, the head B, and the head C in FIGS. 5A to 5D, FIGS. 6A to 6D, and the like) will be described with reference to FIGS. 7 to 12 and the like.

Figure 7:
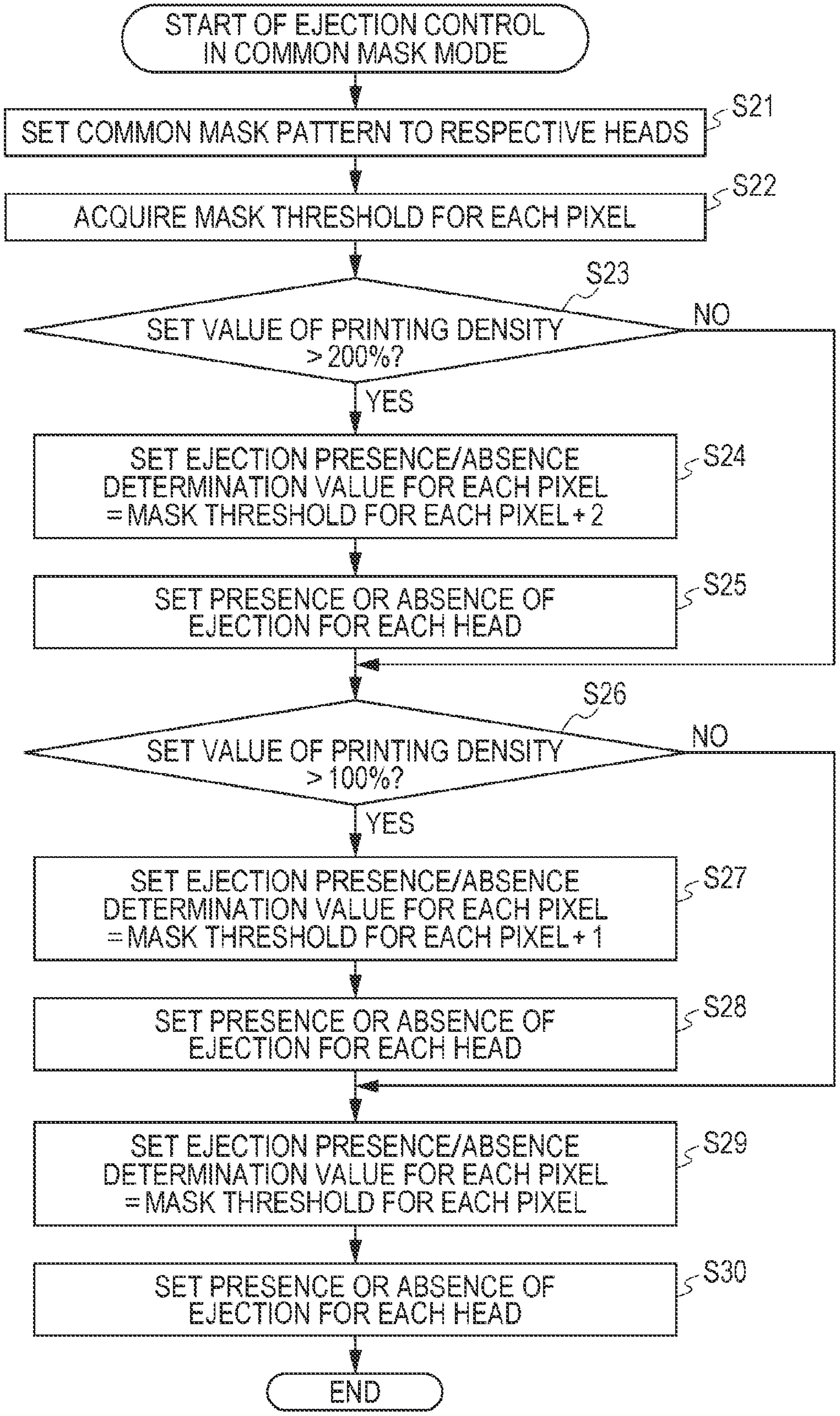
FIG. 7 is a flowchart illustrating ejection control according to the common mask mode.

In this case, a common mask pattern is set in the respective print heads 41 (the head A, the head B, and the head C in the embodiment) taking charge of printing as illustrated in FIG. 7 (step S21).

For example, FIGS. 9A to 9C schematically illustrate a case where four mask patterns each having 3 pixels×3 pixels are tiled, and printing is performed by the three heads (the head A, the head B, and the head C) in a print target area of 6 pixels×6 pixels (a range of an image to be printed). Note that a case where each head has six nozzles (nozzles n1 to n6) and performs printing while performing main scanning along the X direction is illustrated in examples illustrated in FIGS. 9A to 9C and the like.

Then, a "mask threshold" for each pixel is acquired from the mask pattern (shingling mask) tiled in the range of the image to be printed (step S22).

In FIGS. 9A to 9C and the like, values of "1" to "9" applied to the mask pattern mean the "mask thresholds" referred to herein.

Note that a portion having any value for which printing is enabled in each head differs depending on a set value of the printing density.

The control unit 31 first determines whether the set value of the printing density is larger than 200% (step S23). When the set value of the printing density is larger than 200% (step S23; YES), a value obtained by adding "2" to a mask threshold for each pixel is set as an ejection presence/absence determination value for each pixel (step S24).

Then, the presence or absence of ejection is set for each of the three heads (the head A, the head B, and the head C) using this ejection presence/absence determination value (step S25).

After the setting in steps S24 and S25 is performed and when the set value of the printing density is not larger than 200% (step S23; NO), the control unit 31 further determines whether the set value of the printing density is larger than 100% (step S26). When the set value of the printing density is larger than 100% (step S26; YES), a value obtained by adding "1" to a mask threshold for each pixel is set as an ejection presence/absence determination value for each pixel (step S27).

Then, the presence or absence of ejection is set for each of the three heads (the head A, the head B, and the head C) using this ejection presence/absence determination value (step S28).

After the setting in steps S27 and S28 is performed, and when the set value of the printing density is not larger than 100% (step S26; NO), a mask threshold for each pixel is set as an ejection presence/absence determination value for each pixel (step S29).

Then, the presence or absence of ejection is set for each of the three heads (the head A, the head B, and the head C) using this ejection presence/absence determination value (step S30).

That is, in the example of the present embodiment, when the set value of the printing density is larger than 200%, the setting of the ejection presence/absence determination value for each pixel is performed in steps S24, S27, and S29, so that the value obtained by adding "2" to the mask threshold, the value obtained by adding "1" to the mask threshold, and the value obtained by adding nothing to the mask threshold are set as the ejection presence/absence determination values for each pixel.

When the set value of the printing density is larger than 100%, the setting of the ejection presence/absence determination value for each pixel is not performed in step S24, and the setting of the ejection presence/absence determination value for each pixel is performed in steps S27 and S29, so that the value obtained by adding "1" to the mask threshold and the value obtained by adding nothing to the mask threshold are set as the ejection presence/absence determination values for each pixel.

Furthermore, when the set value of the printing density is not larger than 100%, the setting of the ejection presence/absence determination value for each pixel is not performed in steps S24 and S27, and the setting of the ejection presence/absence determination value for each pixel is performed in step S29, so that the value obtained by adding nothing to the mask threshold is set as the ejection presence/absence determination value for each pixel.

In a case where the set value of the printing density is exactly 200% in the determination in step S23, a case where the set value of the printing density is exactly 100% in the determination in step S26 may be handled as the case where the set value of the printing density is larger than 200% or 100%, or may be handled as the case where the set value of the printing density is smaller than 200% or 100%.

Note that the setting of the presence or absence of ejection for each head illustrated in step S25, step S28, and step S30 in FIG. 7 is performed as follows.

Figure 8:
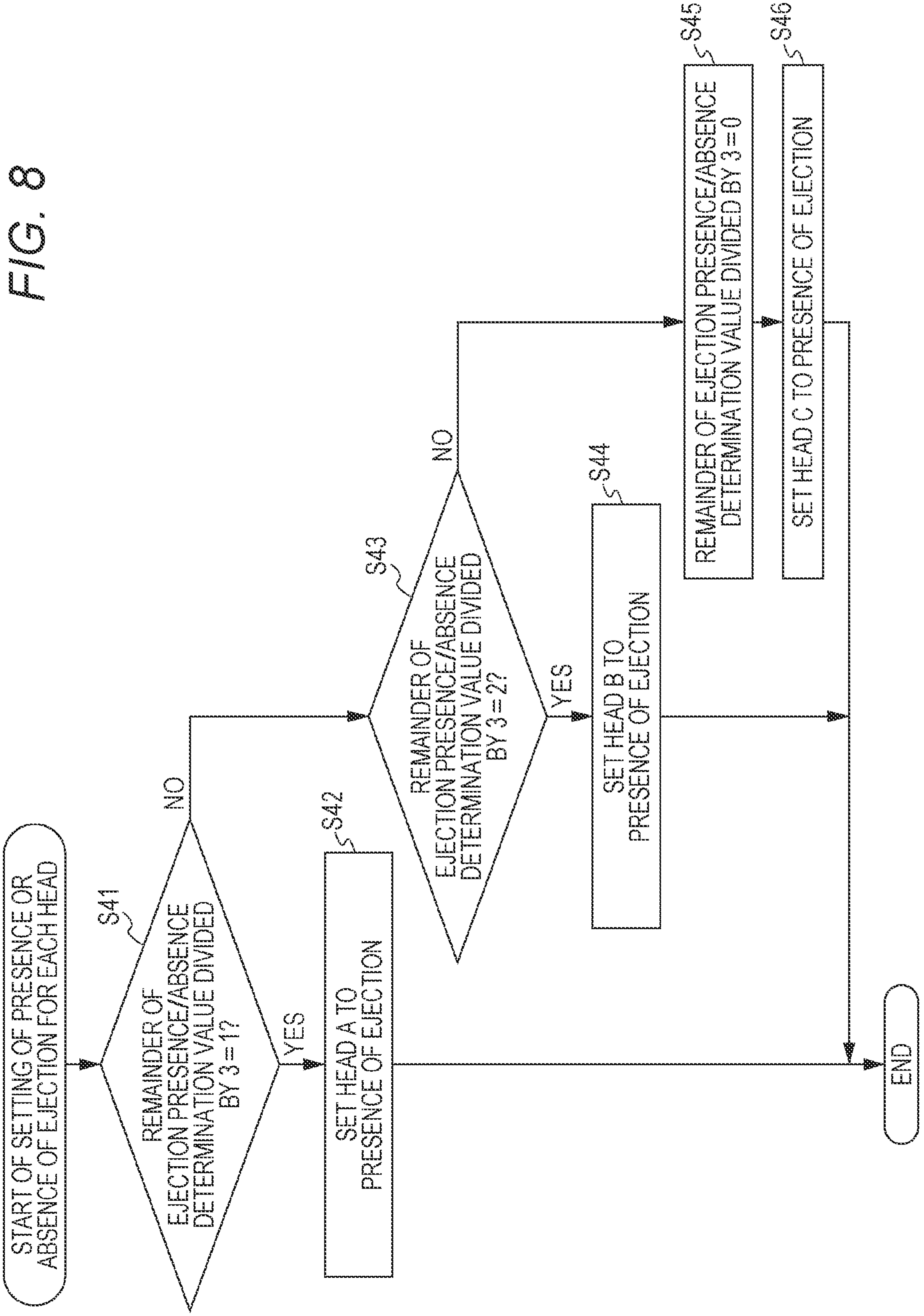
FIG. 8 is a flowchart illustrating ejection control in the common mask mode.

That is, the control unit 31 first divides the ejection presence/absence determination value by three, which is the number of the print heads 41 (the head A, the head B, and the head C in the embodiment) taking charge of printing as illustrated in FIG. 8 to obtain a remainder thereof, and determines whether the remainder is "1" (step S41).

When the remainder is "1" (step S41; YES), the head A is set to the presence of ejection (step S42).

On the other hand, when the remainder is not "1" (step S41; NO), the control unit 31 further determines whether the remainder is "2" (step S43).

When the remainder is "2" (step S43; YES), the head B is set to the presence of ejection (step S44).

Furthermore, when the remainder is neither "2" nor "1" (step S43; NO), the control unit 31 determines that the remainder is "0" (step S45), and in this case, the head C is set to the presence of ejection (step S46).

As described above, for example, when the set value of the printing density exceeds 200%, a value obtained by adding "2" to the mask threshold 1 to 9, a value obtained by adding "1" to the mask threshold 1 to 9, and a value obtained by adding nothing to the mask threshold 1 to 9 are set together as the ejection presence/absence determination values for each pixel (see step S24, step S27, and step S29 in FIG. 7).

For example, first, the value obtained by adding nothing to the mask threshold 1 to 9 is set as the ejection presence/absence determination value for each head in step S29 of FIG. 7.

Therefore, in the setting of the presence or absence of ejection for each head in FIG. 8 in the case corresponding to step S30 of FIG. 7, it is determined as "YES" (see step S41 of FIG. 8) in the case of the ejection presence/absence determination value 1, 4, or 7 (mask threshold 1, 4, or 7), and the ejection control is performed such that printing by the head A to positions (pixels) corresponding to portions of the mask thresholds 1, 4, and 7 is enabled in the tiled mask pattern when the set value of the printing density is not larger than 100%.

On the other hand, the value obtained by adding "1" to the mask threshold 1 to 9 is set as the ejection presence/absence determination value for each head in step S27 of FIG. 7.

Therefore, in the setting of the presence or absence of ejection for each head in FIG. 8 in the case corresponding to step S28 of FIG. 7, it is determined as "YES" in step S43 of FIG. 8 in the case of the ejection presence/absence determination value 2, 5, or 8 (mask threshold 1, 4, or 7), and the ejection control is performed such that printing by the head B to positions (pixels) corresponding to portions of the mask thresholds 1, 4, and 7 is enabled in the tiled mask pattern when the set value of the printing density is larger than 100%.

In addition, the value obtained by adding "2" to the mask threshold 1 to 9 is set as the ejection presence/absence determination value for each head in step S24 of FIG. 7.

Therefore, in the setting of the presence or absence of ejection for each head in FIG. 8 in the case corresponding to step S25 of FIG. 7, it is determined as "YES" in step S45 of FIG. 8 in the case of the ejection presence/absence determination value 3, 6, or 9 (mask threshold 1, 4, or 7), and the ejection control is performed such that printing by the head C to positions (pixels) corresponding to portions of the mask thresholds 1, 4, and 7 is enabled in the tiled mask pattern when the set value of the printing density is larger than 200%.

When the set value of the printing density is larger than 200%, the value obtained by adding "2" to the mask threshold, the value obtained by adding "1" to the mask threshold, and the value obtained by adding nothing to the mask threshold are set together as the ejection presence/absence determination values for each pixel as described above. Therefore, in the setting of the presence or absence of ejection for each head illustrated in FIG. 8, the setting is performed such that the inks are ejected from all the heads (the head A, the head B, and the head C) at the positions corresponding to the mask thresholds 1, 4, and 7.

Similarly, regarding the mask thresholds 2, 5, and 8, in the setting of the presence or absence of ejection for each head in FIG. 8 in the case corresponding to step S30 of FIG. 7, the determination in step S43 is "YES", and printing by the head B to positions (pixels) corresponding to portions of the mask thresholds 2, 5, and 8 is enabled when the set value of the printing density is not larger than 100%. In the setting of the presence or absence of ejection for each head in FIG. 8 in the case corresponding to step S28 of FIG. 7, the determination in step S45 is "YES", and printing by the head C to positions (pixels) corresponding to portions of the mask thresholds 2, 5, and 8 is enabled when the set value of the printing density is larger than 100%. In the setting of the presence or absence of ejection for each head in FIG. 8 in the case corresponding to step S25 of FIG. 7, the determination in step S41 is "YES", and printing by the head A to positions (pixels) corresponding to portions of the mask thresholds 2, 5, and 8 is enabled when the set value of the printing density is larger than 200%.

Therefore, when the set value of the printing density is larger than 200%, the inks are ejected from all the heads (the head A, the head B, and the head C) regarding the positions corresponding to the mask thresholds 2, 5, and 8.

Regarding the mask thresholds 3, 6, and 9, when the set value of the printing density is not larger than 100%, the determination in step S45 of FIG. 8 is "YES", and printing by the head C to positions (pixels) corresponding to portions of the mask thresholds 3, 6, and 9 is enabled. When the set value of the printing density is larger than 100%, the determination in step S41 of FIG. 8 is "YES", and printing by the head A to positions (pixels) corresponding to portions of the mask thresholds 3, 6, and 9 is enabled. When the set value of the printing density is larger than 200%, the determination in step S43 of FIG. 8 is "YES", and printing by the head B to positions (pixels) corresponding to portions of the mask thresholds 3, 6, and 9 is enabled.

Therefore, when the set value of the printing density is larger than 200%, the setting is performed such that the inks are ejected from all the heads (the head A, the head B, and the head C) similarly regarding the positions corresponding to the mask thresholds 3, 6, and 9.

Since the presence or absence of ejection for each head is set according to FIGS. 7 and 8 in this manner, when the set value of the printing density is larger than 200%, the inks are ejected once from all the heads (the head A, the head B, and the head C) to the positions corresponding to the mask thresholds 1 to 9, and as a result, the printing density of 300% is achieved.

Since the heads in which printing is enabled for each pixel are allocated in this manner, the three heads (the head A, the head B, and the head C) can take charge of the ink ejection for each pixel equally without duplication.

Note that a method for causing the respective heads (the head A, the head B, and the head C) to equally perform the ink ejection is not limited to a technique of making the determination using the remainder obtained by dividing the ejection presence/absence determination value by the number of heads as exemplified herein.

In addition, the ejection presence/absence determination value is determined according to the set value of the printing density as described above. That is, the value obtained by adding "2" to the mask threshold is set as the ejection presence/absence determination value when the set value of the printing density exceeds 200% (step S23 of FIG. 7; YES), the value obtained by adding "1" to the mask threshold is set as the ejection presence/absence determination value when the set value of the printing density exceeds 100% (step S26 of FIG. 7; YES), and the mask threshold is set as the ejection presence/absence determination value when the set value of the printing density is smaller than 100% (step S26 of FIG. 7; NO). Therefore, the remainder obtained by the division by the number of heads also changes according to the printing density, and there is no duplication of pixels where the ink is ejected among the heads (the head A, the head B, and the head C) or among the densities.

Note that, in a case where the set value of the printing density is smaller than 100% (for example, is 90%), a condition that an ink is to be ejected to a pixel having a value equal to or smaller than a mask threshold×90% may be added to cope with the case.

In addition, for example, in a case where the printing density is set to 90% and printing is performed by the three heads (the head A, the head B, and the head C), printing of 30% may be allocated to each of the heads.

In addition, for example, in a case where a printing density that is a multiple of the number of heads is set as in a case where the printing density is set to 270%, the printing density is equally shared by the respective heads. For example, in a case where the printing density of 270% is shared by the three heads (the head A, the head B, and the head C), for example, mask thresholds to be shared are appropriately thinned out such that each of the heads achieves a printing density of 90%.

For example, FIG. 9A illustrates a configuration of the nozzles n1 to n6 of the head A, a mask pattern applied to the ejection control of the head A, and a result of performing printing using the head A by applying the mask pattern.

In addition, FIG. 9B illustrates a configuration of the nozzles n1 to n6 of the head B, a mask pattern applied to the ejection control of the head B, and a result of performing printing using the head B by applying the mask pattern.

Furthermore, FIG. 9C illustrates a configuration of the nozzles n1 to n6 of the head C, a mask pattern applied to the ejection control of the head C, and a result of performing printing using the head C by applying the mask pattern.

FIGS. 9A to 9C and the like illustrate an example in which a mask threshold indicating a pixel (this is set as a reference pixel) to be in charge of by each head is defined as follows in a case where the printing density of 100% is achieved using all the heads (the head A, the head B, and the head C).

That is, as illustrated in FIG. 9A, in a range of an image to be printed including 6 pixels×6 pixels in which the mask patterns are tiled, pixels where "1", "4", and "7" are set as mask thresholds are reference pixels for which the head A needs to be in charge of ink ejection (pixels where the ink ejection from the head A is enabled). In FIG. 9A, pixels for which the ejection by the head A is enabled are indicated by thin shading as illustrated at the right end in the drawing.

Similarly, reference pixels for which the head B needs to be in charge of ink ejection (pixels where the ink ejection from the head B is enabled) are pixels where "2", "5", and "8" are set as mask thresholds in a range of an image to be printed including 6 pixels×6 pixels as illustrated in FIG. 9B. In FIG. 9B, pixels for which the ejection by the head B is enabled are indicated by thin shading as illustrated at the right end in the drawing.

In addition, reference pixels for which the head C needs to be in charge of ink ejection (pixels where the ink ejection from the head C is enabled) are pixels where "3", "6", and "9" are set as mask thresholds in a range of an image to be printed including 6 pixels×6 pixels as illustrated in FIG. 9C. In FIG. 9C, pixels for which the ejection by the head C is enabled are indicated by thin shading as illustrated at the right end in the drawing.

Figure 10:
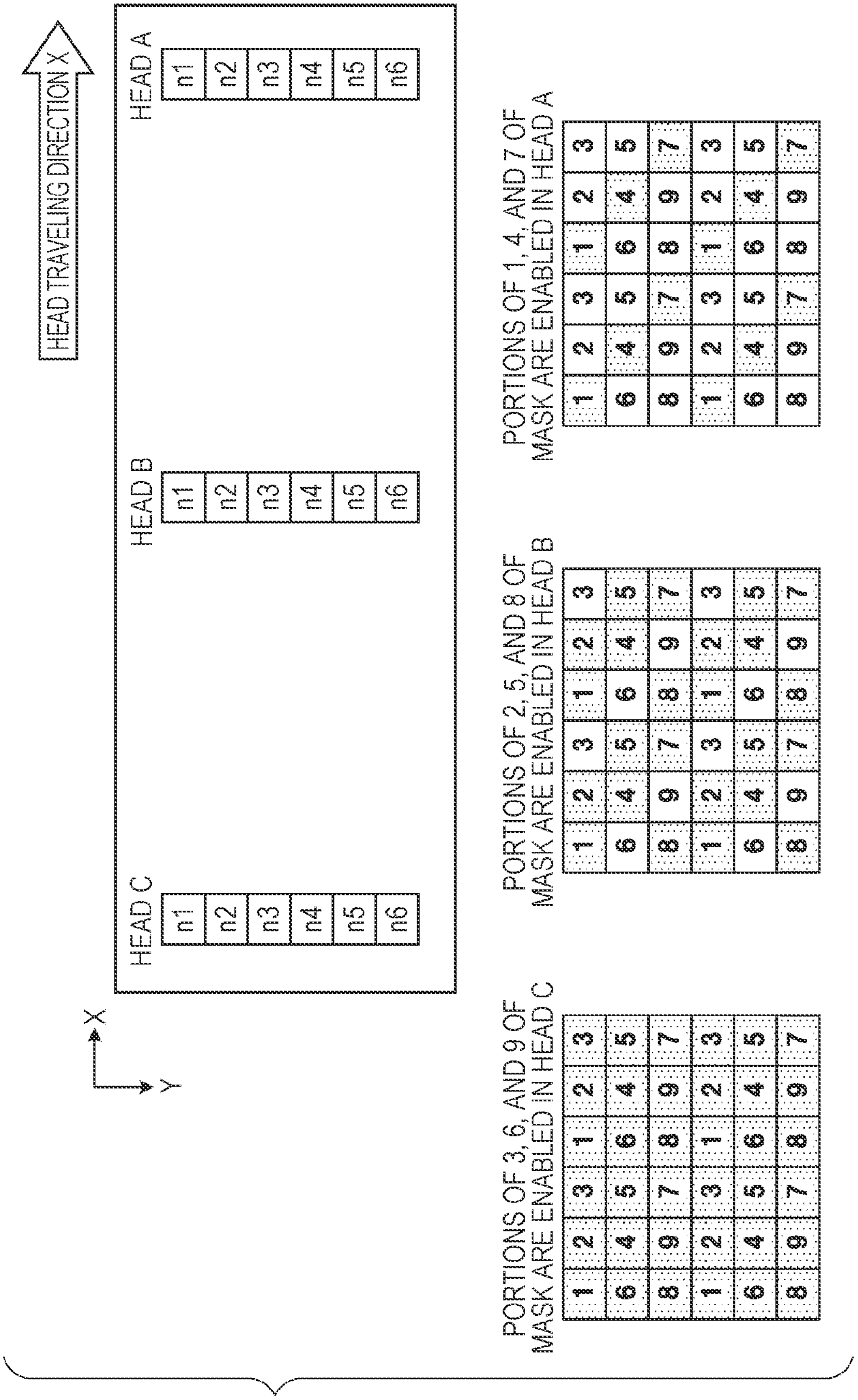
FIG. 10 is an explanatory view for describing a case of performing printing at a printing density of 100% in the common mask mode.
Figure 11:
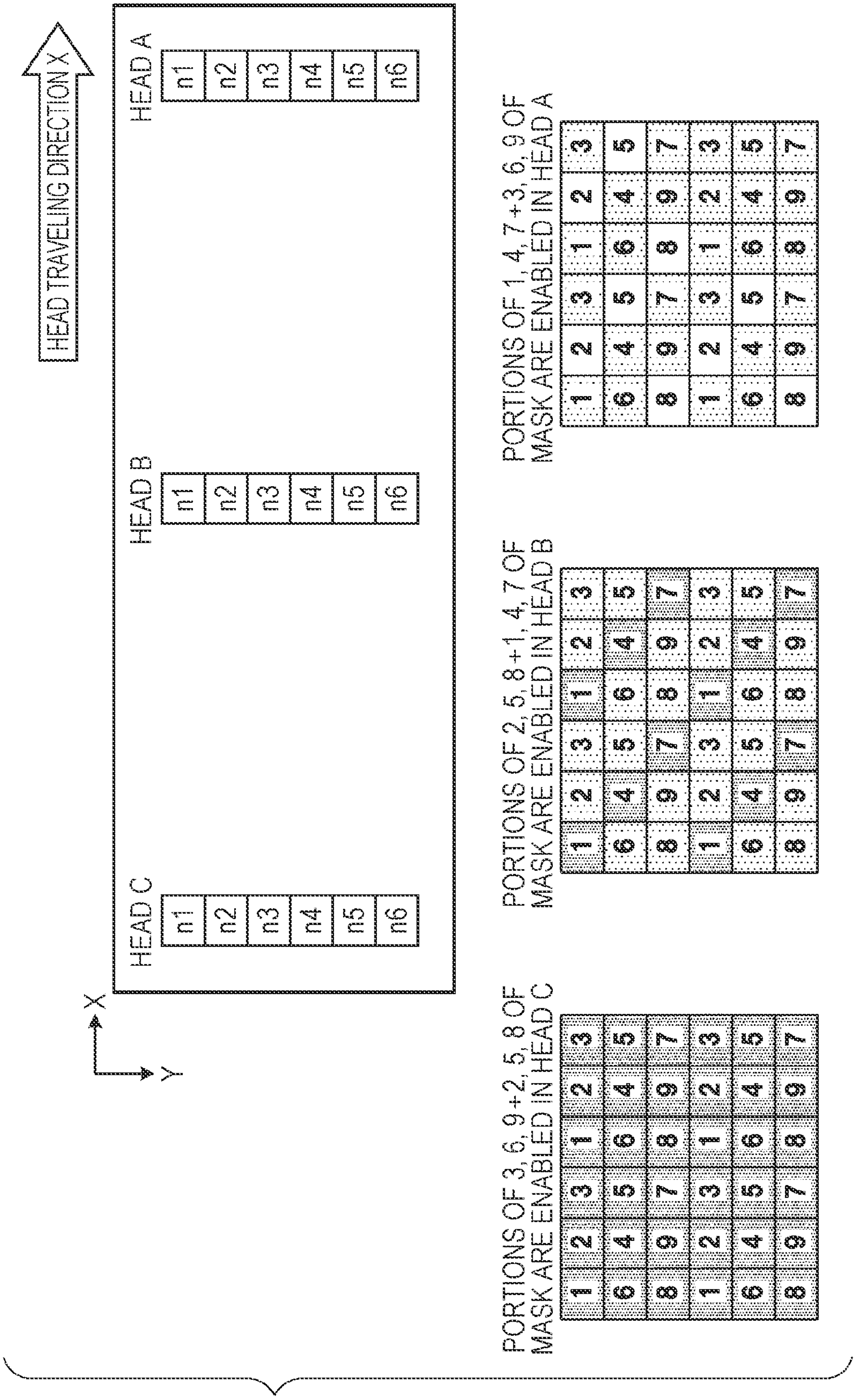
FIG. 11 is an explanatory view for describing a case of performing printing at a printing density of 200% in the common mask mode.
Figure 12:
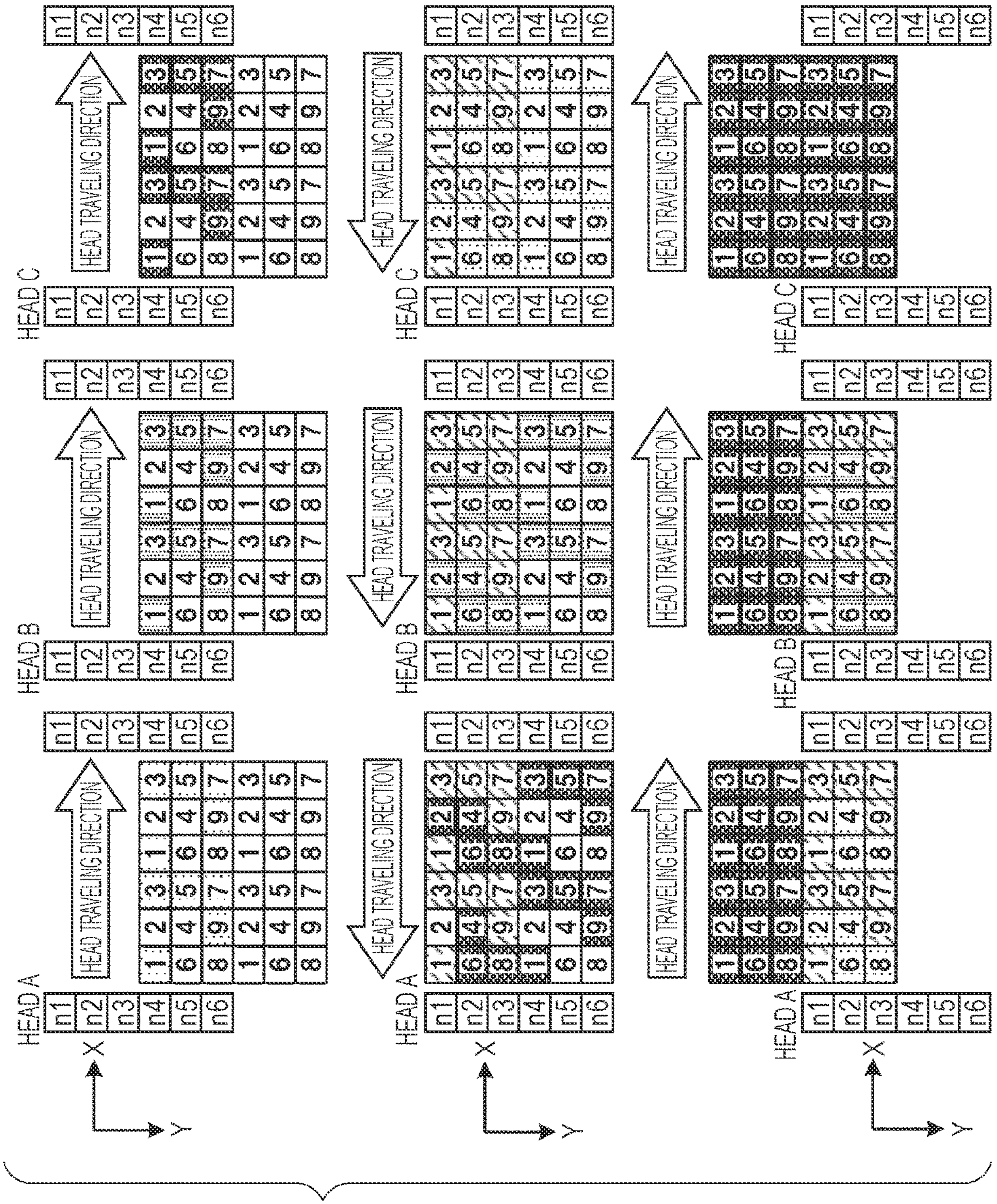
FIG. 12 is an explanatory view for describing a case of performing printing at a printing density of 300% in the common mask mode.

FIGS. 10 to 12 are explanatory views for describing how to perform printing specifically by each of the heads (the head A, the head B, and the head C) illustrated in FIGS. 9A to 9C.

FIG. 10 illustrates a case where printing is performed at a printing density of 100%, and FIG. 11 illustrates a case where printing is performed at a printing density of 200%. FIG. 12 illustrates a case of performing printing at a printing density of 300%. Note that it is assumed in FIGS. 10 and 11 that each of the heads (the head A, the head B, and the head C) moves along the X direction from the left side to the right side in the drawing.

In the case where the printing is performed at the printing density of 100%, as illustrated in FIG. 10, the head A first passes through a print target area (area corresponding to the range where the mask pattern is tiled), and positions (pixels) corresponding to "1", "4", and "7" of the mask pattern are enabled, and the ink is ejected from the nozzles n1 to n6 of the head A.

Next, when the head B passes through the print target area, positions (pixels) corresponding to "2", "5", and "8" of the mask pattern are enabled, and the ink is ejected from the nozzles n1 to n6 of the head B.

Finally, when the head C passes through the print target area, positions (pixels) corresponding to "3", "6", and "9" of the mask pattern are enabled, and the ink is ejected from the nozzles n1 to n6 of the head C.

As a result, as illustrated in the lower part of FIG. 10, all positions (pixels) corresponding to the mask thresholds 1 to 9 in the area where the mask pattern is set by the three heads (the head A, the head B, and the head C) are enabled, and the printing at 100% without omission or duplication can be performed by causing the respective heads to eject the inks to different positions according to the mask pattern.

In addition, in the case where the printing is performed at the printing density of 200%, as illustrated in FIG. 11, the head A first passes through the print target area. At that time, the positions (pixels) corresponding to "3", "6", and "9" are enabled in addition to the positions (pixels) corresponding to "1", "4", and "7" of the mask pattern, and the ink is ejected from the nozzles n1 to n6 of the head A.

Next, when the head B passes through the print target area, positions (pixels) corresponding to "1", "4", and "7" are enabled in addition to the positions (pixels) corresponding to "2", "5", and "8" of the mask pattern, and the ink is ejected from the nozzles n1 to n6 of the head B.

Finally, when the head C passes through the print target area, the positions (pixels) corresponding to "2", "5", and "8" are enabled in addition to the positions (pixels) corresponding to "3", "6", and "9" of the mask pattern, and the ink is ejected from the nozzles n1 to n6 of the head C.

As a result, as illustrated in the lower part of FIG. 11, the ink is ejected twice equally to all positions (pixels) corresponding to the mask threshold 1 to 9 in the area where the mask pattern is set by the three heads (the head A, the head B, and the head C), and the clear printing at 200% without duplication or the like can be performed.

In addition, regarding the case where the printing is performed at the printing density of 300%, a case where the print target area of 6 pixels×6 pixels is divided into two in the Y direction (sub-scanning direction), printing for three rows on the upstream side in the Y direction (upper side in FIG. 12) is first performed by the nozzles n4, n5, and n6 of the head A, the head B, and the head C, and then, the print head 41 is moved to the downstream side (lower side in FIG. 12) by the amount corresponding to the three nozzles to perform printing for the remaining three rows on the downstream side is exemplified in FIG. 12. The example illustrated in FIG. 12 illustrates a shingling operation in a case where a rule that, among the nozzles n1 to n6 of each of the heads (the head A, the head B, and the head C), the nozzles n4, n5, and n6 eject the ink only to positions (pixels) corresponding to portions where mask thresholds are odd numbers and the nozzles n1, n2, and n3 eject the ink only to positions (pixels) corresponding to portions where mask thresholds are even numbers is provided and printing is performed on the entire print target area of 6 pixels×6 pixels by repeating three passes including "from left to right", "from right to left", and "from left to right" in the X direction.

In this case, first, in a case where printing is performed while moving the head A, the head B, and the head C "from left to right" in the X direction (this is referred to as a "first pass") as illustrated in the first stage of the drawing, positions (pixels) corresponding to "1", "4", and "7" of the mask pattern are originally used as the reference pixels in the head A, but in addition to these, positions (pixels) corresponding to "2", "5", and "8" and positions (pixels) corresponding to "3", "6", and "9" are enabled since the printing density is 300%. However, the nozzles n4, n5, and n6 are in charge of printing in the "first pass", and thus, the ink is ejected only to positions (pixels) corresponding to portions where mask thresholds are odd numbers. As a result, the ink is ejected to "1", "3", "5", "7", and "9" as illustrated in FIG. 12. Similarly, in the head B, positions (pixels) corresponding to "2", "5", and "8" of the mask pattern are originally used as the reference pixels, but in addition to these, positions (pixels) corresponding to "3", "6", "9", "1", "4", and "7" are enabled. Then, the ink is ejected from the nozzles n4, n5, and n6 to "1", "3", "5", "7", and "9" whose mask thresholds are odd numbers. Since the same applies to the head C, at a time point when the "first pass" has been completed up to the head C, the ink is ejected from the three heads to the pixels corresponding to the mask thresholds "1", "3", "5", "7", and "9", and only these portions are in the state of 300%.

Next, as illustrated in the second stage of the drawing, printing is performed while moving the head C, the head B, and the head A "from right to left" in the X direction (this is referred to as a "second pass"). In the "second pass", the print head 41 is moved to the downstream side by the amount corresponding to the three nozzles from the time point of completion of the "first pass".

In this case as well, each of the heads is originally enabled for all mask threshold portions, but the nozzles in charge of printing for three rows on the upstream side in the Y direction in the "second pass" are the nozzles n1, n2, and n3. Therefore, the ink is ejected only to positions (pixels) corresponding to portions where mask thresholds is even numbers. As a result, at a time point when the "second pass" has been completed, the ink is ejected from the three heads to "2", "4", "6", and "8" that have not been printed in the "first pass", and these portions are in the state of 300%. Therefore, at the time point when the "second pass" has been completed, printing densities of areas of the three rows on the upstream side in the Y direction are all 300%.

In addition, printing for three rows on the downstream side in the Y direction is performed by the nozzles n4, n5, and n6 of the head A, the head B, and the head C in the "second pass". For such a portion, the ink is ejected from the three heads to "1", "3", "5", "7", and "9" similarly to the case of the "first pass", and only these portions are in the state of 300%.

Furthermore, as illustrated in the third stage of the drawing, printing is performed while moving the head C, the head B, and the head A "from left to right" in the X direction (this is referred to as a "third pass"). In the "third pass", the print head 41 is moved to the downstream side by the amount corresponding to the three nozzles from the time point of completion of the "second pass". As a result, the nozzles n1, n2, and n3 of the head A, the head B, and the head C are in charge of printing for the three rows on the downstream side in the Y direction.

As a result, at a time point when the "third pass" has been completed, the ink is ejected from the three heads to "2", "4", "6", and "8" that have not been printed in the "second pass", and these portions are in the state of 300%. Therefore, at the time point the "third pass" has been completed, printing densities of areas of the three rows on the upstream side and the three rows on the downstream side in the Y direction are all 300%.

For example, when printing at a high density such as the printing density of 300% is performed, the ink ejection at 100% is performed from each of the heads (the head A, the head B, and the head C). In this case, when printing is performed by applying the common mask pattern (shingling mask) to all the heads, the ink is continuously ejected from the head B and the head C without much delay after the ink is ejected from the head A as illustrated in FIG. 12. Therefore, the aggregation of the ink or the like is likely to occur, and there is a possibility that the finish quality of printing deteriorates.

Next, a case where the "second mode" ("individual mask mode") is applied to the ejection control of the print head 41 (the head A, the head B, and the head C) will be described with reference to FIGS. 13 to 18 and the like.

Figure 13:
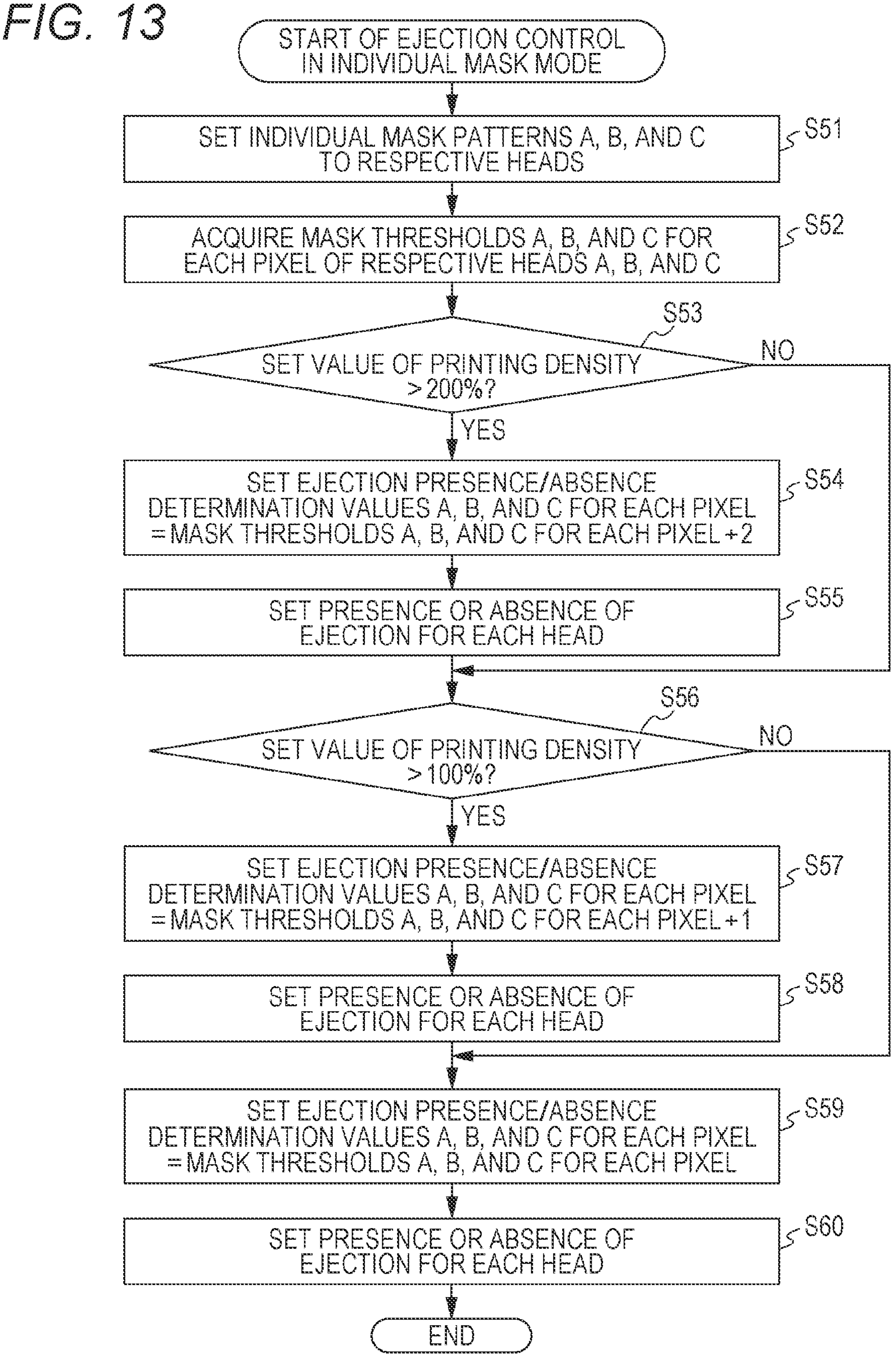
FIG. 13 is a flowchart illustrating ejection control according to the individual mask mode.

As illustrated in FIG. 13, in this case, individual mask patterns (Mask A, Mask B, and Mask C in FIG. 15 and the like) are set respectively in the print heads 41 (the head A, the head B, and the head C in the embodiment) taking charge of printing (step S51). Note that the mask patterns (Mask A, Mask B, and Mask C) respectively applied to the heads (the head A, the head B, and the head C) may be generated with random sequences, or one pattern may be vertically or horizontally inverted by 180 degrees or rotated by 90 degrees to be used as another mask pattern. When a plurality of types of mask patterns are created by changing directions of a basic pattern in this manner, the amount of data stored in the storage unit 32 or the like can be reduced.

For example, FIGS. 15A to 15C schematically illustrate a case where four mask patterns each having 3 pixels×3 pixels are tiled, and printing is performed by the three heads (the head A, the head B, and the head C) in a print target area of 6 pixels×6 pixels (a range of an image to be printed). Note that a case where each head has six nozzles (nozzles n1 to n6) and performs printing while performing main scanning along the X direction is illustrated in examples illustrated in FIGS. 15A to 15C and the like.

Then, mask thresholds (a mask threshold of Mask A, a mask threshold of Mask B, and a mask threshold of Mask C) for each pixel are acquired from the respective mask patterns (Mask A, Mask B, and Mask C) tiled in the range of the image to be printed (step S52).

Note that values of "1" to "9" applied to the mask pattern in FIGS. 15A to 15C and the like mean the "mask thresholds" referred to herein similarly to FIGS. 9A to 9C.

Next, the control unit 31 determines whether a set value of the printing density is larger than 200% (step S53), and, when the set value of the printing density is larger than 200% (step S53; YES), sets a value obtained by adding "2" to the mask threshold for each pixel of each of the masks (Mask A, Mask B, and Mask C) as an ejection presence/absence determination value for each pixel of each of the masks (Mask A, Mask B, and Mask C) (step S54).

Then, the presence or absence of ejection of each of the heads (the head A, the head B, and the head C) is set using this ejection presence/absence determination value (step S55).

After the setting in steps S54 and S55 is performed and when the set value of the printing density is not larger than 200% (step S53; NO), the control unit 31 further determines whether the set value of the printing density is larger than 100% (step S56). When the set value of the printing density is larger than 100% (step S56; YES), a value obtained by adding "1" to the mask threshold for each pixel of each of the masks (Mask A, Mask B, and Mask C) is set as an ejection presence/absence determination value for each pixel of each of the masks (Mask A, Mask B, and Mask C) (step S57).

Then, the presence or absence of ejection of each of the heads (the head A, the head B, and the head C) is set using this ejection presence/absence determination value (step S58).

After the setting in steps S57 and S58 is performed, and when the set value of the printing density is not larger than 100% (step S56; NO), the mask threshold for each pixel of each of the masks (Mask A, Mask B, and Mask C) is set as an ejection presence/absence determination value for each pixel of each of the masks (Mask A, Mask B, and Mask C) (step S59).

Then, the presence or absence of ejection of each of the heads (the head A, the head B, and the head C) is set using this ejection presence/absence determination value (step S60).

That is, in the example of the present embodiment, when the set value of the printing density is larger than 200%, the value obtained by adding "2" to the mask threshold, the value obtained by adding "1" to the mask threshold, and the value obtained by adding nothing to the mask threshold are set together as the ejection presence/absence determination values for each pixel, which is similar to the case of the "first mode" ("common mask mode"). When the set value of the printing density is larger than 100%, the value obtained by adding "1" to the mask threshold and the value obtained by adding nothing to the mask threshold are set as the ejection presence/absence determination values for each pixel. Furthermore, when the set value of the printing density is not larger than 100%, the value obtained by adding nothing to the mask threshold is set as the ejection presence/absence determination value for each pixel.

In a case where the set value of the printing density is exactly 200% in the determination in step S53, a case where the set value of the printing density is exactly 100% in the determination in step S56 may be handled as the case where the set value of the printing density is larger than 200% or 100%, or may be handled as the case where the set value of the printing density is smaller than 200% or 100%.

Note that the setting of the presence or absence of ejection for each head illustrated in step S55, step S58, and step S60 in FIG. 13 is performed as follows.

Figure 14:
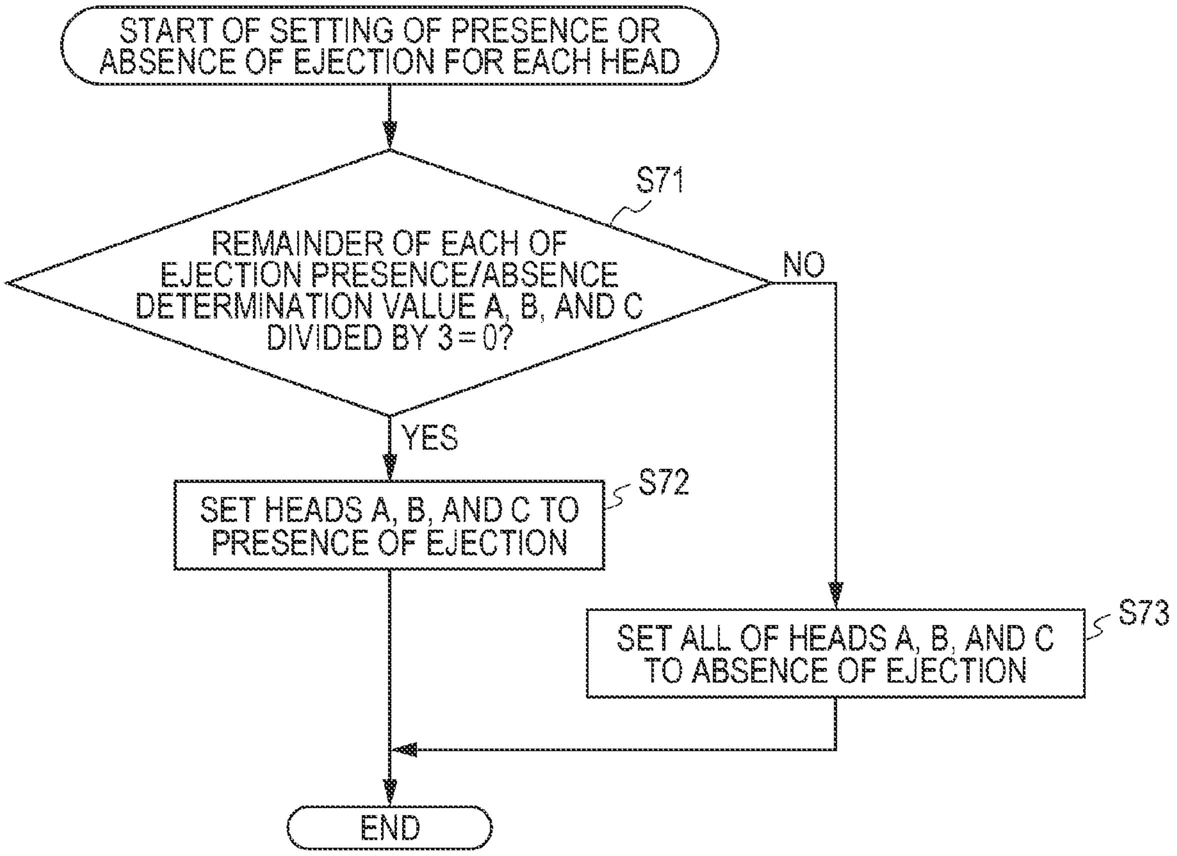
FIG. 14 is a flowchart illustrating ejection control in the individual mask mode.

That is, the control unit 31 first divides the ejection presence/absence determination value of each of the masks (Mask A, Mask B, and Mask C) by three, which is the number of the print heads 41 (the head A, the head B, and the head C in the embodiment) taking charge of printing as illustrated in FIG. 14 to obtain a remainder thereof, and determines whether the remainder is "0" (step S71).

When the remainder is "0" (step S71; YES), the head A, the head B, and the head C are set to the presence of ejection (step S72).

On the other hand, when the remainder is not "0" (step S71; NO), each of the heads (the head A, the head B, and the head C) is set to the absence of ejection (step S73).

In the case of the "first mode" ("common mask mode"), the value of the remainder determined for each head is changed to avoid the duplication of the pixel as illustrated in FIG. 8 in the setting of the presence or absence of ejection for each head. In the case where the "second mode" ("individual mask mode") is applied, however, the "mask pattern" ("shingling mask") to be used differs for each head, and thus, it is possible to avoid the duplication of the pixel without changing the value of the remainder at the time of dividing the ejection presence/absence determination value by the number of heads of three.

Therefore, the setting of the presence or absence of ejection may be performed with one value as in the case where the value of the remainder is "0" or the like as illustrated in FIG. 14. That is, in this case, for example, pixels corresponding to mask thresholds 3, 6, and 9 in which the remainder obtained by dividing the ejection presence/absence determination value at the printing density of 100% by three is "0" are set as reference pixels to be in charge of ink ejection by each of the heads (the head A, the head B, and the head C).

Figure 15:
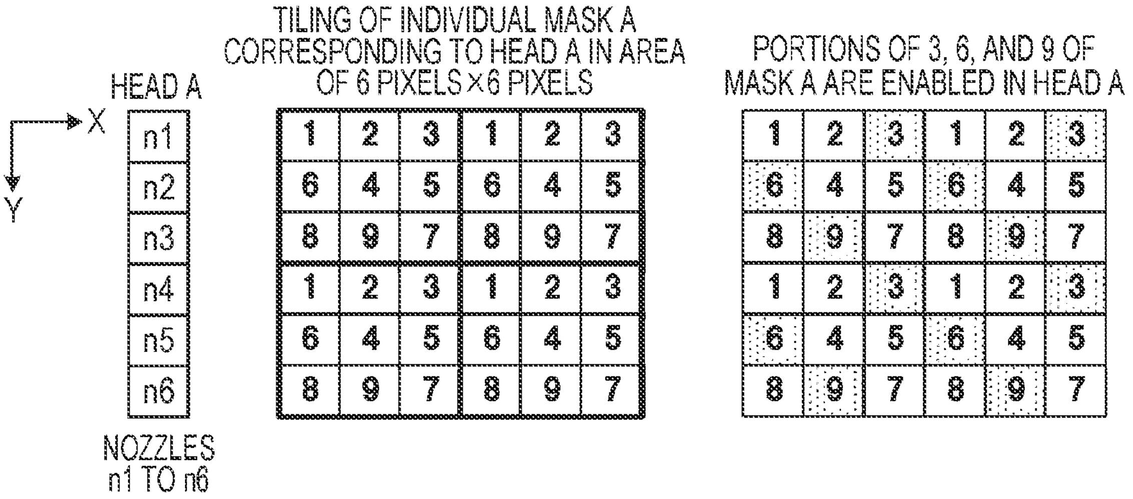
FIG. 15 is an explanatory view illustrating ejection control when an individual mask pattern is used by exemplifying the case of the head A.

For example, FIG. 15 illustrates a configuration of the nozzles n1 to n6 of the head A, a mask pattern applied to the ejection control of the head A, and a result of performing printing using the head A by applying the mask pattern (Mask A).

As illustrated in FIG. 15, in a range of an image to be printed including 6 pixels×6 pixels in which the mask patterns are tiled, pixels where "3", "6", and "9" are set as mask thresholds are reference pixels for which the head A originally needs to be in charge of ink ejection (pixels where the ink ejection is enabled). In FIG. 15, pixels for which the ejection by the head A is enabled are indicated by thin shading as illustrated at the right end in the drawing.

Although not illustrated, the nozzles n1 to n6 are similarly provided for the head B and the head C, and printing is performed by applying Mask B to the ejection control of the head B and applying Mask C to the ejection control of the head C. In both the head B and the head C, reference pixels (pixels where the ink ejection is enabled) originally in charge of the ink ejection are pixels where "3", "6", and "9" are set as the mask thresholds in the range of the image to be printed including 6 pixels×6 pixels in which the mask patterns are tiled.

Figure 16:
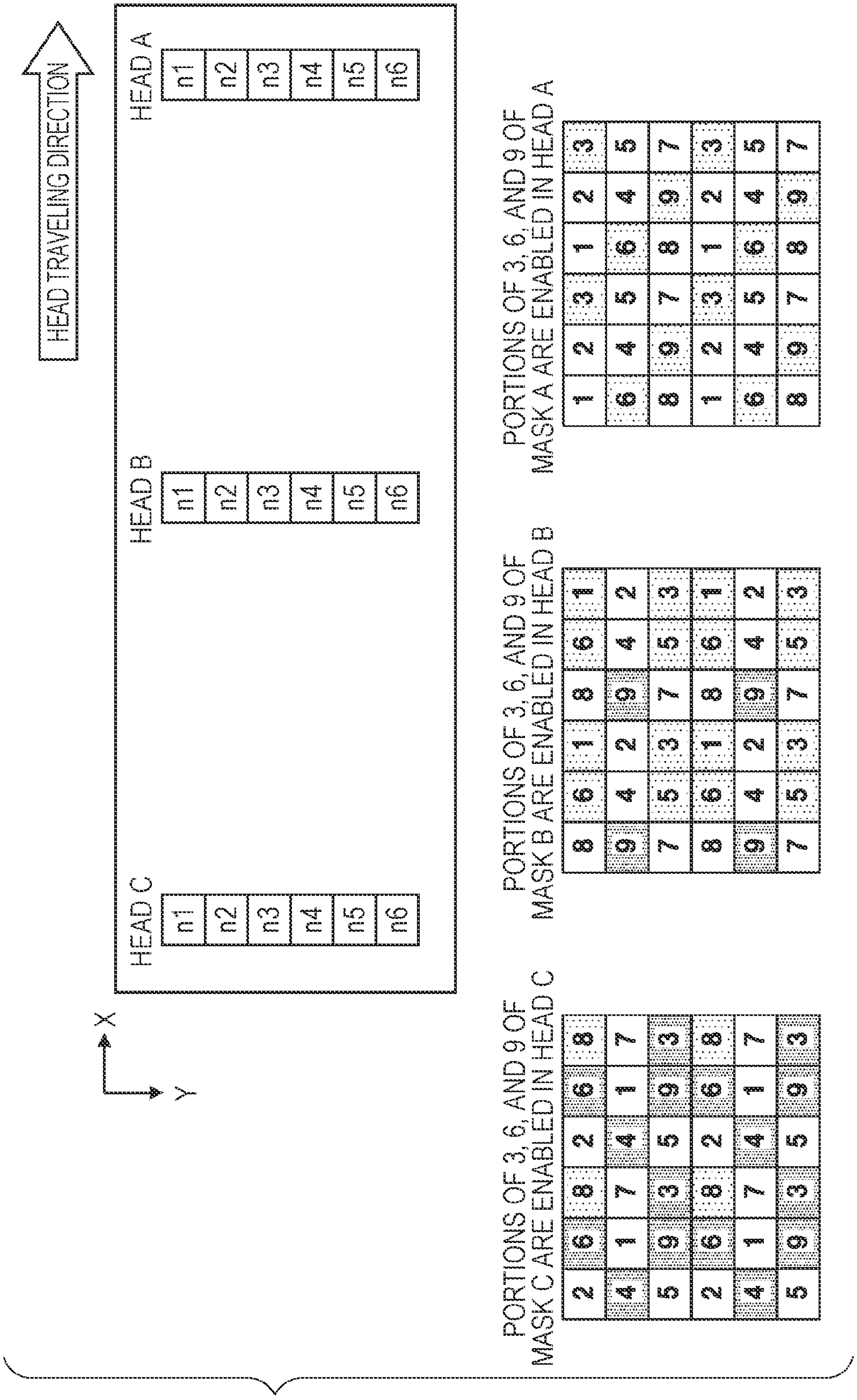
FIG. 16 is an explanatory view for describing a case of performing printing at a printing density of 100% in the individual mask mode.
Figure 17:
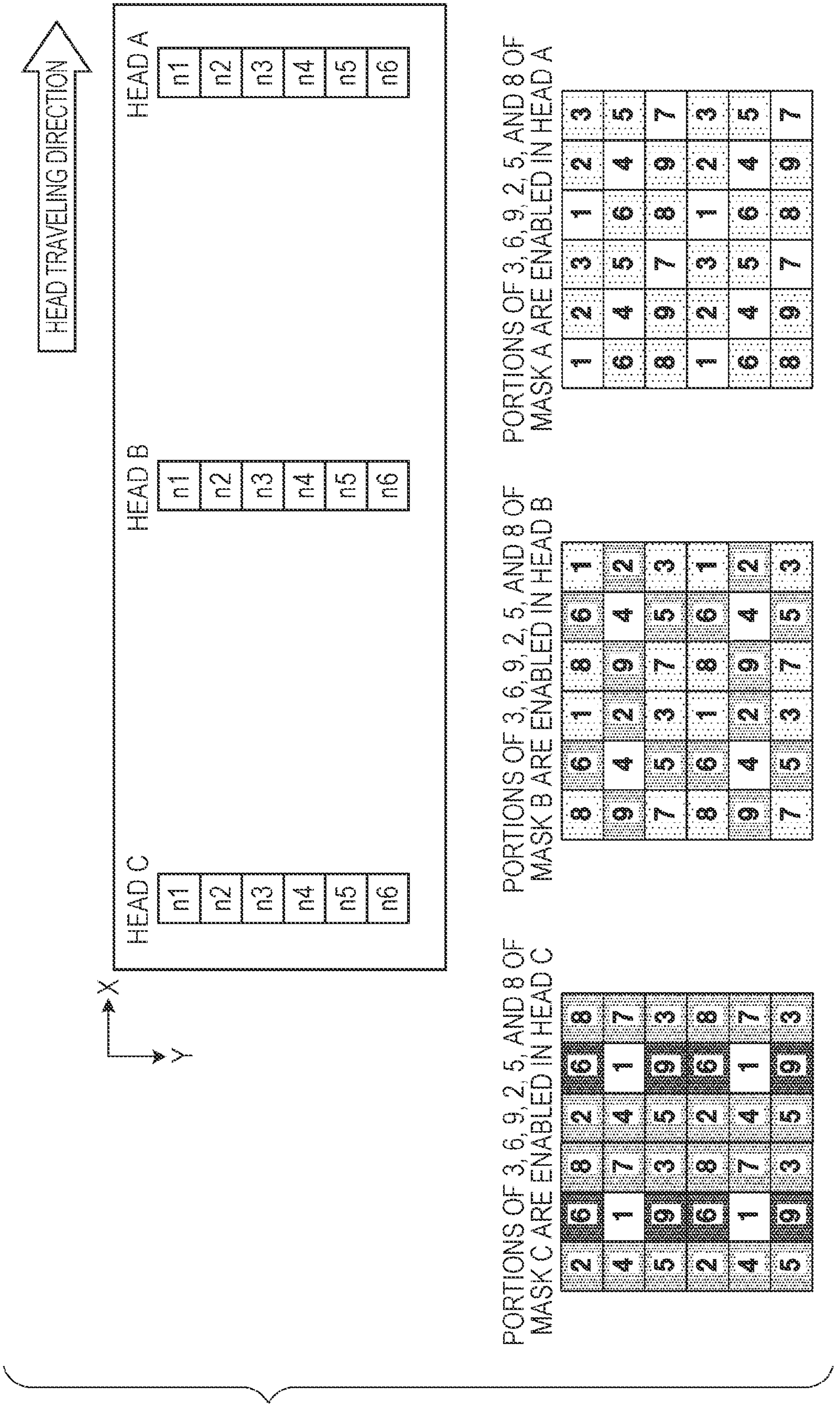
FIG. 17 is an explanatory view for describing a case of performing printing at a printing density of 200% in the individual mask mode.
Figure 18:
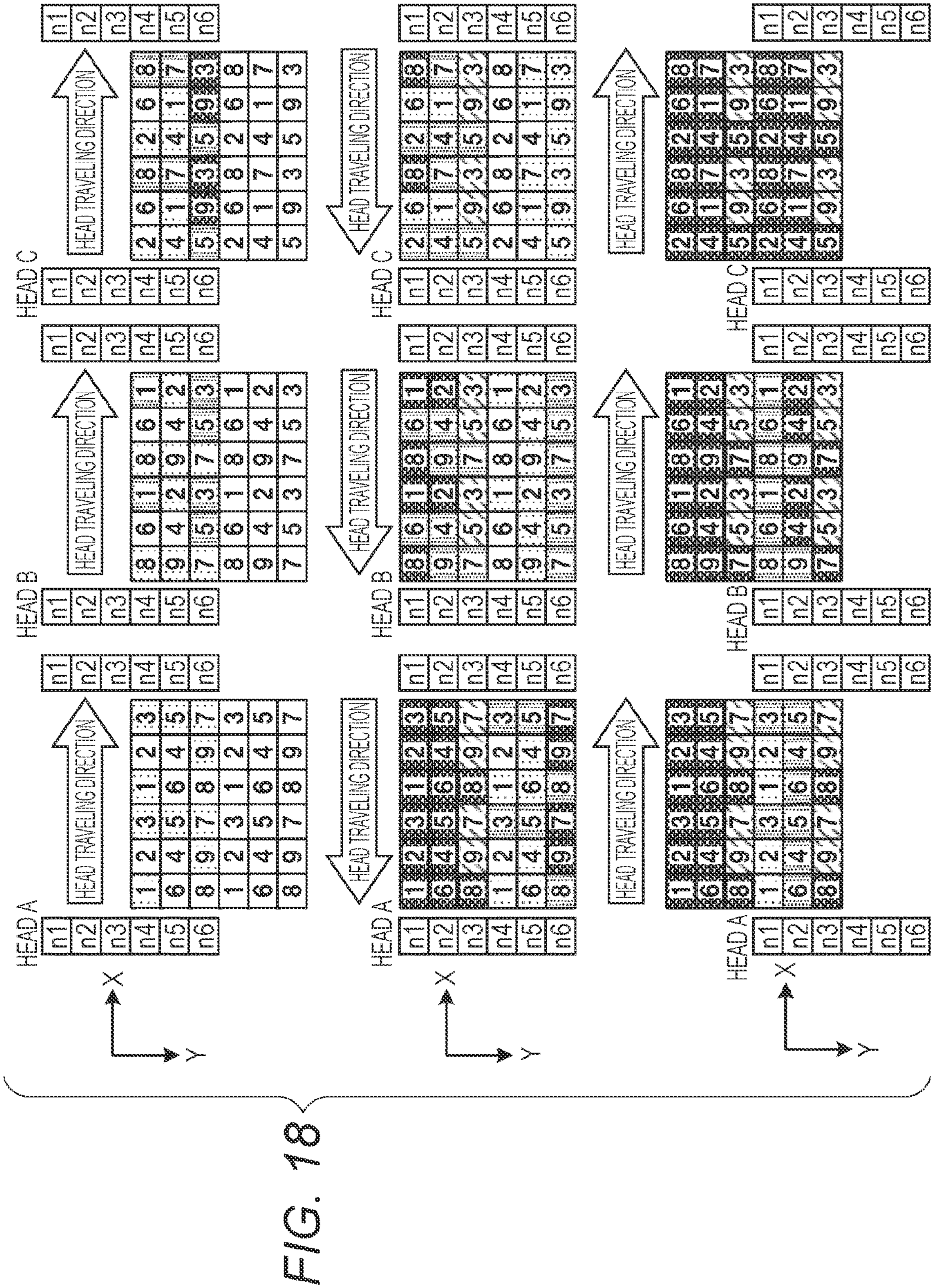
FIG. 18 is an explanatory view for describing a case of performing printing at a printing density of 300% in the individual mask mode.

FIGS. 16 to 18 are explanatory views for describing how to perform printing specifically by each of the heads (the head A, the head B, and the head C).

FIG. 16 illustrates a case where printing is performed at a printing density of 100%, and FIG. 17 illustrates a case where printing is performed at a printing density of 200%. FIG. 18 illustrates a case of performing printing at a printing density of 300%. Note that it is assumed in FIGS. 16 and 17 that each of the heads (the head A, the head B, and the head C) moves from the left side to the right side in the drawing.

In the case where the printing is performed at the printing density of 100%, as illustrated in FIG. 16, the head A first passes through a print target area (area corresponding to the range where the mask pattern is tiled), and positions (pixels) corresponding to "3", "6", and "9" of the mask pattern are enabled, and the ink is ejected from the nozzles n1 to n6 of the head A.

Next, when the head B passes through the print target area, positions (pixels) corresponding to "3", "6", and "9" of the mask pattern are also enabled, and the ink is ejected from the nozzles n1 to n6 of the head B.

Finally, when the head C passes through the print target area, positions (pixels) corresponding to "3", "6", and "9" of the mask pattern are enabled, and the ink is ejected from the nozzles n1 to n6 of the head C.

In this manner, the positions (pixels) corresponding to the same mask thresholds are enabled in all the heads, but the mask patterns applied to the respective heads are different in the case of the "second mode" ("individual mask mode"), and thus, positions where the ink is ejected are dispersed.

In this case, however, the positions (pixels) at which the ink ejection is enabled in each of the heads are allocated by the different mask patterns, and thus, a pixel at which the ink is not ejected by any head or conversely, a pixel at which the ink is ejected in an overlapping manner are generated, and it is difficult to necessarily fill all the pixels even if each of the heads performs printing at 100%. Therefore, a printing result becomes rough and does not have high quality.

This similarly applies to, for example, the case where the printing density is 200% as illustrated in FIG. 17.

On the other hand, in the case of the high density such as the printing density of 300% illustrated in FIG. 18, for example, when it is assumed that the printing density of 300% is achieved by three reciprocations of the "first pass" to the "third pass" as illustrated in FIG. 12, there is a high possibility that the timing of ejecting the ink to the same position (pixel) is shifted for each head according to the "second mode" ("individual mask mode").

For example, when a rule similar to that illustrated in FIG. 12 is applied such that, among the nozzles n1 to n6 of each of the heads (the head A, the head B, and the head C), the nozzles n4, n5, and n6 eject the ink only to positions (pixels) corresponding to portions where mask thresholds are odd numbers, and the nozzles n1, n2, and n3 eject the ink only to positions (pixels) corresponding to portions where mask thresholds are even numbers, the timing of ejecting the ink to the same position (pixel) is different for each head in the passes, and a situation in which the ink is ejected from all the heads continuously to the same position (pixel) can be avoided.

Specifically, for example, a mask threshold corresponding to a pixel at the upper left end in FIG. 18 is "1" (odd number) in Mask A applied to the head A, and thus, the ink is ejected from the nozzles in the "first pass" in which the nozzles n4, n5, and n6 in charge of the odd number pass through the print target area. On the other hand, a mask threshold corresponding to the same pixel at the upper left end is "8" (even number) in Mask B applied to the head B, and a mask threshold corresponding to the pixel is "2" (even number) in Mask C applied to the head C, and thus, the ink is not ejected in the "first pass", and the ink is ejected from the nozzles in the "second pass" in which the nozzles n1, n2, and n3 in charge of the even number pass through the print target area.

In this manner, the timing of ejecting the ink is shifted by one pass, and thus, the aggregation of the ink or the like is less likely to occur even when the printing density is high, and the printing is not disturbed, so that a high-quality printing result can be obtained.

In this manner, there is a difference in the quality of the printing result depending on the printing density between the case of applying the common mask pattern to all the heads and the case of applying individual mask patterns respectively for the heads. The mask pattern suitable for the printing density can be applied to perform the printing by switching which one of these points is applied to perform the printing processing.

Note that it can be said that the set value of the printing density is naturally larger than 100% when the set value of the printing density is larger than 200% (that is, step S23; YES in FIG. 7 and step S53; YES in FIG. 13) in both the case where the ejection presence/absence determination value is obtained in the "first mode" ("common mask mode") in which the common mask pattern is applied to the respective heads (see FIG. 7) and in the case where the ejection presence/absence determination value is obtained in the "second mode" ("individual mask mode") in which the individual mask patterns are applied to the respective heads (see FIG. 13).

Therefore, the process of determining whether the set value of the printing density is larger than 100% (that is, step S26 in FIG. 7 and step S56 in FIG. 13) may be omitted, and only the setting of the ejection presence/absence determination value for each pixel and the setting of the presence or absence of ejection for each head (that is, step S28 in FIG. 7 and step S58 in FIG. 13) when the set value of the printing density is larger than 100% (that is, step S27 in FIG. 7 and step S57 in FIG. 13), and the setting of the ejection presence/absence determination value for each pixel (that is, step S29 in FIG. 7 and step S59 in FIG. 13) and the setting of the presence or absence of ejection for each head (that is, step S30 in FIG. 7 and step S60 in FIG. 13) when the set value of the printing density is not larger than 100% may be performed.

Here, undercoating density setting processing in a case where the control unit 31 sets a printing density of an undercoating to be printed on a nail when the print head 41 can print the undercoating before printing a design will be specifically described with reference to FIGS. 19 to 26. Note that the undercoating density (printing density of the undercoating) varies depending on an application amount of an undercoating ink, and a high undercoating density means that the application amount of the undercoating ink is large and the concealability is high.

Figure 19:
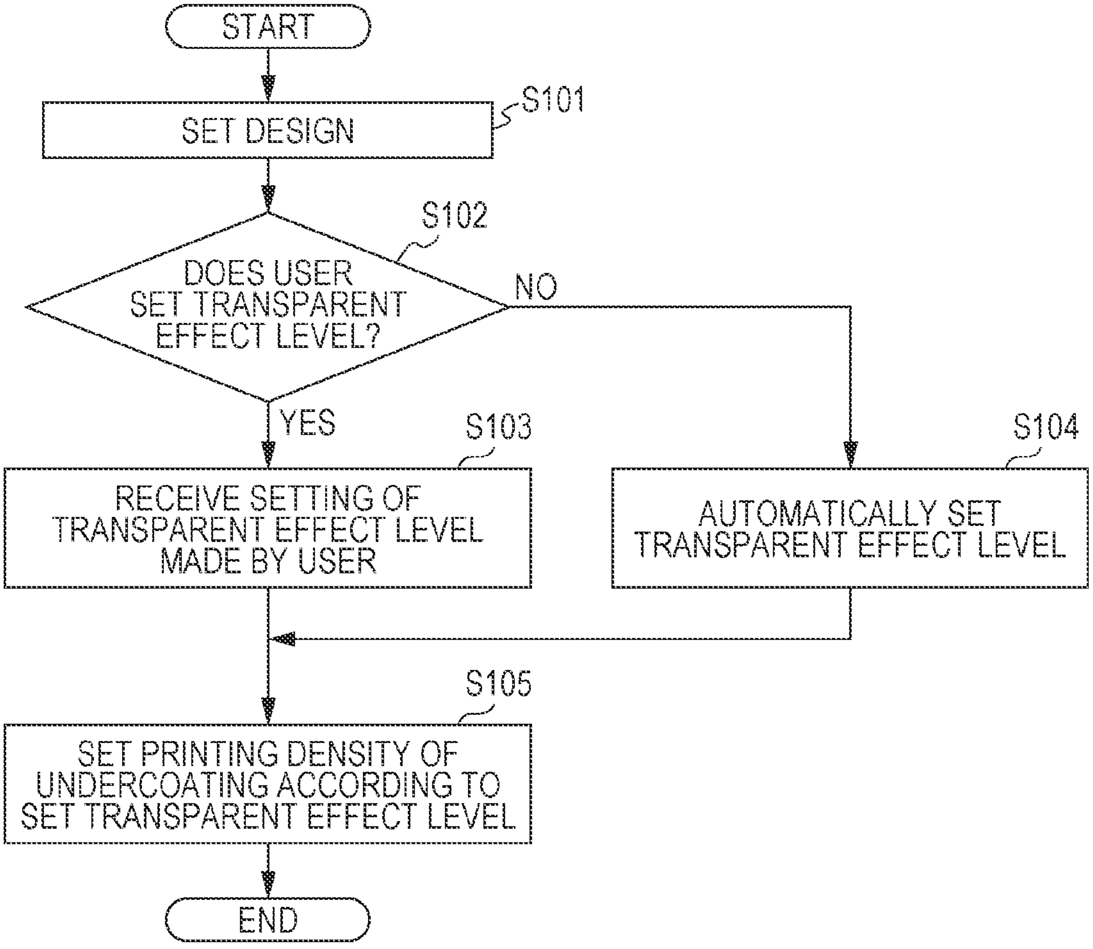
FIG. 19 is a flowchart illustrating transparent effect level setting processing.

In this case, first, as illustrated in FIG. 19, when the user selects and inputs a design desired to be printed on the nail from the operation unit 12 or the like, the control unit 31 receives the input operation and sets the design (step S101). Next, the control unit 31 determines whether the user has selected and input to set a transparent effect level by himself/herself (step S102). The "transparent effect" is transparency of the design at the time of printing, and affects how a ground nail looks at the time of printing the design. When the transparent effect level is set to be high, a finish with a transparent impression is obtained. When the transparent effect level is set to be low, the undercoating ink of white or the like is firmly overcoated to obtain a finish with high concealability. In a case where the user desires to set the transparent effect level by himself/herself (step S102; YES), the control unit 31 receives the setting of the transparent effect level input by the user (step S103). For example, when the user performs adjustment by setting the transparent effect level to Level 5 due to a desire for a more transparent finish in a case where the transparent effect level corresponding to the design selected by the user is Level 3, the control unit 31 receives this input. On the other hand, in a case where the user does not set the transparent effect level by himself/herself (entrusts the device side with the setting) (step S102; NO), the control unit 31 automatically sets the transparent effect level (step S104).

An association table (LUT; Look Up Table, see FIG. 23) is stored in the storage unit 32 and the like of the present embodiment, and the control unit 31 refers to the LUT (hereinafter, referred to as a "transparent effect table") when the transparent effect level has been manually set by the user or automatically set by the control unit 31, and sets the undercoating printing density associated with the set transparent effect level (step S105).

Note that the printing density of the undercoating may be directly set without setting the transparent effect level. However, the transparent effect level is more directly linked to a completed image of a desired design rather than the printing density value of the undercoating, and thus, is easily understandable and preferable as a value set by the user.

FIG. 23 is a view illustrating an example of the transparent effect table.

For example, in the illustrated example, the transparent effect level is divided into Levels 1 to 7, and Level 7 is the highest transparent effect level. Specifically, Level 7 is, for example, a level which provides a complete transparent effect that enables a ground nail to be seen as it is without applying the undercoating ink at all and is associated with an undercoating printing density of 0%. On the other hand, Level 1 is a level at which the transparent effect level is the lowest and there is no transparent effect so that the ground nail cannot be seen at all. In this case, an associated undercoating printing density is, for example, 300%. As described above, the upper limit of the printing density is set to the density of 300% assuming that the printing density in the completion state of printing performed once for the entire printing area is set to 100% in the present embodiment, and Transparent Effect Level 1 means that the undercoating is printed up to the upper limit of the printing density.

In FIG. 23, the transparent effect level is associated with the printing density in increments of 50% by the LUT, but the association between the transparent effect level and the printing density is not limited to the illustrated example. The relationship between the undercoating printing density (undercoating application amount) and the "transparent effect" is also affected by a type of undercoating ink. Therefore, the transparent effect table may be provided for each type of undercoating ink. In addition, the undercoating printing density (undercoating application amount) is preferably determined such that the transparent effect level becomes linear. For example, application amounts at intermediate levels of Levels 1 to 99 may be obtained by a calculation assuming the printing density (application amount) at which a ground nail is completely invisible as Transparent Effect Level 0 and an application amount 0% of the undercoating ink (undercoating printing density 0%) as Transparent Effect Level 100.

Figure 20:
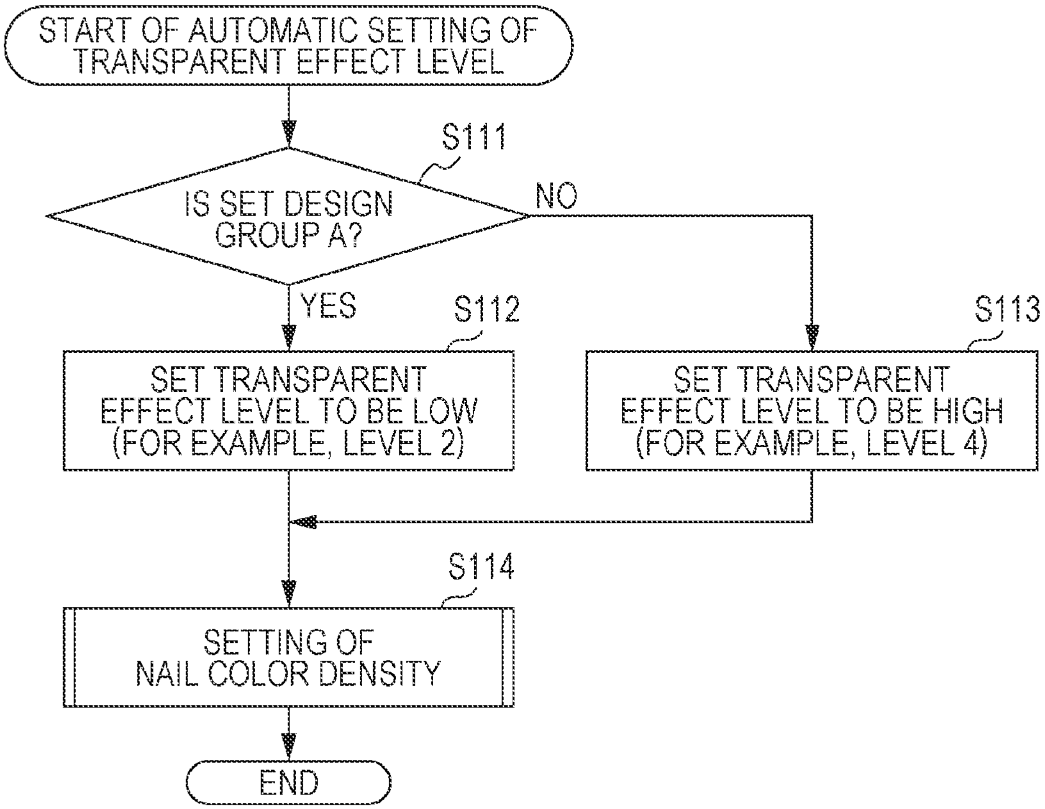
FIG. 20 is a flowchart illustrating transparent effect level automatic setting processing.
Figure 21:
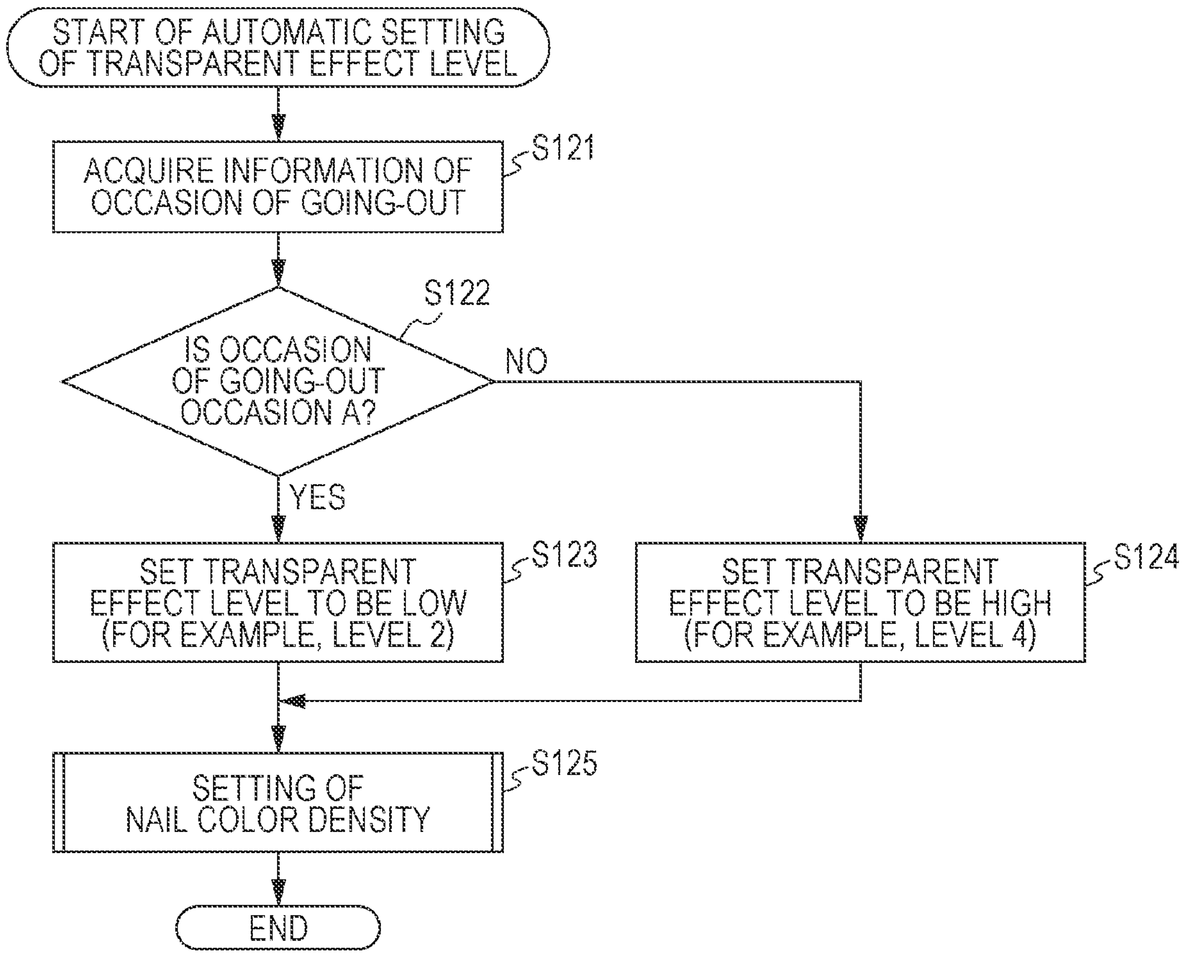
FIG. 21 is a flowchart illustrating transparent effect level automatic setting processing.
Figure 22:
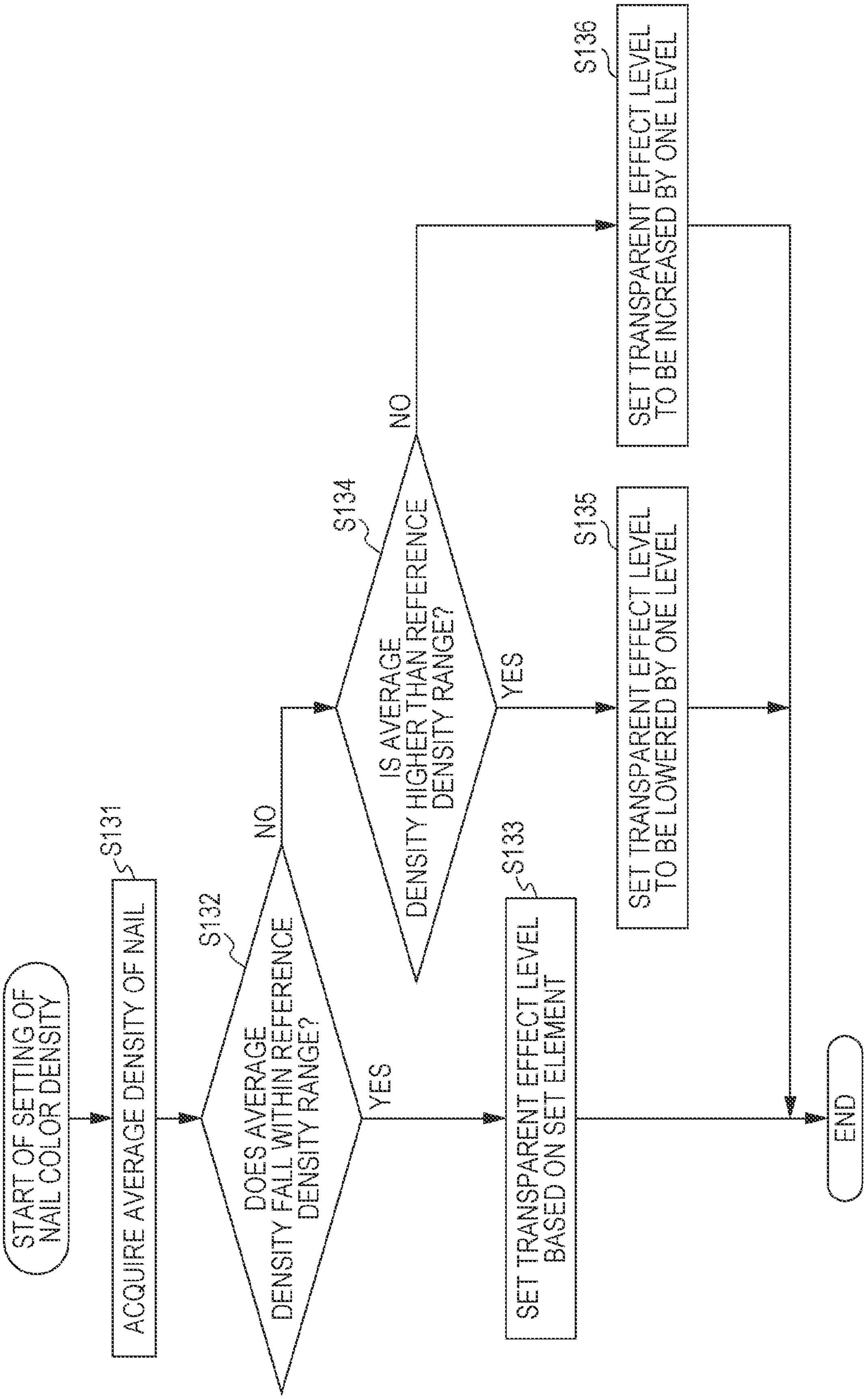
FIG. 22 is a flowchart illustrating nail color density setting processing.

FIGS. 20 to 22 are flowcharts illustrating processing in a case where a transparent effect level is automatically set.

For example, FIG. 20 illustrates a case where the transparent effect level is automatically set from a design selected and set by the user (see step S101 in FIG. 19).

For example, a design association table (hereinafter, referred to as a "design LUT", see FIG. 24) in which a design and a transparent effect level suitable for the design are associated with each other is stored in the storage unit 32 or the like.

In the design LUT, a group of designs for which a lower transparent effect level particularly results in a more beautiful finish is set as Group A, and the other designs are set as Group B. A design to be included in Group A may be determined by default, or any design that the user desires to print on an undercoating having particularly excellent concealability may be freely registered. In addition, a change may be appropriately made according to the user's preference by removing a design registered in Group A in advance by default from Group A afterwards, newly registering a design that has not been originally put to Group A, or the like.

For example, designs of characters (of an animation, a cartoon, and the like), a national flag, and the like are generally printed on an undercoating that is excellent in concealability to achieve more beautiful color development and a clear and preferable finish. Therefore, designs such as the character and national flag are put in Group A, and the other designs are put in Group B in the example illustrated in FIG. 24.

As illustrated in FIG. 20, the control unit 31 refers to the design LUT as illustrated in FIG. 24 to determine whether a design set as a design to be printed (see step S101 in FIG. 19) belongs to Group A (step S111).

Then, when the design has been put (registered) in Group A (step S111; YES), the transparent effect level is set to be low (for example, to Level 2 or the like) (step S112). On the other hand, when the design is not put in Group A (is put in Group B, step S111; NO), the transparent effect level is set to be high (for example, to Level 4 or the like) (step S113).

Note that the determination as to whether the set design is put in Group A may be made from, for example, a design image, or a design may have profile data and the control unit 31 may be able to read information indicating that the design is in Group A or information on a transparent effect level.

When the transparent effect level according to the design is set, the control unit 31 further sets a density based on a nail color (step S114).

FIG. 22 is a flowchart for describing nail color density setting processing.

As illustrated in FIG. 22, an average density of a nail is first acquired (measured) (step S131) in the nail color density setting processing. A technique for acquiring the average density is not particularly limited, but for example, a nail is imaged by the camera 51 to acquire an image of the nail, and RGB values (values of R=Red, G=Green, and B=Blue) are acquired from the image. The RGB values in this case may be an average value, or a value obtained by adding all the values may be used.

Then, it is determined whether the acquired average density of the nail falls within a reference density range (step S132). A technique by which the control unit 31 determines whether the density falls within the reference density range is not particularly limited. For example, a table defining the reference density range (hereinafter referred to as a "nail color density determination table") for each of the RGB values is stored in the storage unit 32 or the like, and the control unit 31 refers to the nail color density determination table to determine whether the average density of the nail falls within the reference density range.

FIG. 26 is a view illustrating an example of the nail color density determination table.

The example illustrated in FIG. 26 illustrates a case where a reference density range of R is 150 to 170, and reference density ranges of G and B are 100 to 120. Note that any value of the reference range is appropriately set.

When the average density of the nail falls within the reference density range (step S132; YES), the set transparent effect level based on an element (for example, design) is set without any change. For example, in FIG. 20, when the transparent effect level according to the design is set to Level 4, the "Transparent Effect Level 4" is set without performing correction in consideration of the nail color (step S133).

On the other hand, when none of the RGB values of the average density of the nail fall within the reference density range (step S132; NO), the control unit 31 further determines whether the average density of the nail is higher than the reference density range (step S134). The reference density is expressed by RGB values, and it can be said that the density is higher as the numerical value thereof is smaller Therefore, for example, when a value of R of the nail color is 130 or the like, it is determined that the average density of the nail is higher than the reference density range (step S134; YES). In this case, a level lowered by one level from the set transparent effect level based on the element (for example, design or the like) is set as a transparent effect level (step S135). For example, as in the above-described example, in a case where the transparent effect level according to the design is set to Level 4, the control unit 31 sets "Transparent Effect Level 3" in consideration of the nail color.

On the other hand, when it is determined that the average density of the nail is lower than the reference density range (step S134; NO), a level increased by one level from the set transparent effect level based on the element is set as a transparent effect level (step S136). For example, in a case where the transparent effect level according to the design is set to Level 4, the control unit 31 sets "Transparent Effect Level 5" in consideration of the nail color.

Note that, for example, in a case where RGB values are acquired from an image of a nail captured by the camera 51, the acquired numerical values vary depending on conditions of the camera 51, the light source 52, and the like, and thus, it is preferable to determine a value of the reference density range for each device.

When a nail color is dark, it is difficult to perform printing of a design in which the influence of a ground nail is suppressed unless the undercoating printing density is increased. In this regard, if a transparent effect level is corrected according to the density of the nail color, appropriate printing according to the nail color can be performed.

Note that it is not essential to perform the nail color density setting processing, and the printing density may be set according to the transparent effect level set in steps S112 and S113 of FIG. 20.

In addition, the automatic setting of the transparent effect level is not limited to the case of being performed based on the design. Any impression of a nail that the user desires to give (whether it is desired to have transparency or to have a clear picture, and the like) varies depending on when and where the user goes out with the nail print, various situations such as time, a place, and an occasion.

Therefore, for example, the transparent effect level may be automatically set according to an occasion (place) where the user goes out with printing of the selected design.

FIG. 21 is a flowchart illustrating an example of processing in a case where the transparent effect level is automatically set according to the occasion of going-out.

In this case, an occasion association table (hereinafter referred to as an "occasion LUT", see FIG. 25) in which an occasion (place) of going-out and a transparent effect level suitable for the occasion (place) are associated with each other is stored in, for example, the storage unit 32 or the like.

In the occasion LUT, an occasion for which a lower transparent effect level is particularly preferred is set as Occasion A, and the other occasions are set as Occasion B. An occasion to be put in Occasion A may be determined by default, or an occasion where the user particularly desires to go out with a nail print at a low transparent effect level may be registered. In addition, a change may be appropriately made according to the user's preference by removing an occasion registered in Occasion A in advance by default from Occasion A afterwards, newly registering an occasion that has not been originally put to Occasion A, or the like.

For example, in occasions of sports events such as a baseball game, animation events, and the like, generally, a nail print in which a design is clearly printed on an undercoating having excellent concealability tends to be preferred. Therefore, in the example illustrated in FIG. 25, the occasions of sports events, animation events, and the like are put in Occasion A, and the other occasions are regarded as Occasion B.

In this case, as illustrated in FIG. 21, the control unit 31 first acquires information (occasion information) regarding an occasion of going-out indicating any occasion in which the user goes out with the nail print (step S121). A way of acquiring the occasion information is not particularly limited. For example, the user may be caused to input a schedule to go out in advance, a destination, and the like from the operation unit 12 or the like, and the control unit 31 may acquire the occasion information from the input information.

When the information on the occasion of going-out is acquired, the control unit 31 refers to the occasion LUT as illustrated in FIG. 25 and determines whether the occasion of going-out belongs to Occasion A (step S122).

When the occasion (place) where the user is about to go out has been put (registered) in Occasion A (step S122; YES), the transparent effect level is set to be low (for example, to Level 2 or the like) (step S123). On the other hand, when the occasion (place) is not put in Occasion A (is put in Occasion B, step S122; NO), the transparent effect level is set to be high (for example, to Level 4 or the like) (step S124).

In this case as well, the nail color density setting (see step S125 and FIG. 22) may be further performed to correct the transparent effect level according to the nail color.

Note that a transparent effect level may be determined by combining various elements in the case of automatically setting the transparent effect level. In this case, each element or item may be prioritized or weighted as appropriate to set the transparent effect level.

The priority or weighting assigned to each element or item may be determined by the user or may be set by default. Even in the case of being set by default, the user may arbitrarily change the setting. In addition, a current transparent effect level as a reference may be corrected up and down in advance when a transparent effect level is increased or lowered. For example, in a case where the user prefers a finish with an overall transparent effect when a default transparent effect level is Level 3, the default transparent effect level may be changeable to Level 4.

In addition, the case of considering the tendency of the design to be printed (whether Group A for which it is preferable to have a lower transparent effect level or the other group), the tendency of the destination to go out with the printed nail design (whether the occasion or place is Occasion A in which one having a lower transparent effect level is preferable or the other occasion), and the nail color density when the control unit 31 automatically sets the transparent effect level has been exemplified here, but an element considered in the case of automatically setting the transparent effect level is not limited thereto. For example, the age or the gender of the user, whether the user is an adult or a child (for example, a middle school student or younger), and the like may be considered. All or some of these elements may be prioritized or weighted, and a plurality of elements may be multiplied and considered. Furthermore, when the user inputs feelings such as pleasant, sad, and happy, as information, a transparent effect level suitable for the information (for example, a low transparent effect level such that a pattern is printed clearly in the case of "pleasant") may be proposed.

Furthermore, here, a case where the design LUT and the occasion LUT are classified into a set for which a lower transparent effect level is preferable (Group A and Occasion A) and the other set (Group B, Occasion B) has been exemplified, but the configuration of the association LUT is not limited thereto. For example, a set for which a particularly high transparent effect level is preferable can be registered, and classification with the other set may be performed. In addition, the printing density may be set by being classified into three sets of a set for which a lower transparent effect level is preferable, a set for which a higher transparent effect level is preferable, and the other set.

As described above, the printing apparatus 1 of the present embodiment includes: the print head 41 which includes the plurality of nozzles n1 to n6 ejecting the ink that is the liquid agent and performs printing on the nail as the print target; and the printing control unit 313 that controls the ejection operation of the print head 41 based on the "mask pattern" as the "ejection specification data" defining ejection of the ink, and the like. At least the "first mode" and the "second mode" are provided with respect to the application of the "ejection specification data", and the printing control unit 313 switches between the "first mode" and the "second mode" based on the "mask mode switching value" which is the threshold of the "set ejection amount" ("preset density threshold").

As a result, whether the required printing density is a high density or a low density, the "mask pattern" can be applied in a manner suitable for each density, and a high-quality printing result can be obtained regardless of the printing density.

Furthermore, in the present embodiment, the plurality of print heads 41 are provided, and the printing control unit 313 controls the ejection operation in the "first mode" in which the common ejection specification data is applied to all the print heads 41 when printing is performed at a density lower than the threshold of the "set ejection amount" ("preset density threshold") and controls the ejection operation in the "second mode" in which the individual ejection specification data is applied to each of the print heads 41 when printing is performed at a density higher than the threshold of the "set ejection amount".

In the low-density printing, it is preferable to apply the common mask pattern to the plurality of print heads 41 so as not to generate a non-landing pixel and a duplicated pixel. On the other hand, if the common mask pattern is applied to the plurality of print heads 41, there is a possibility that the ink is continuously ejected from the plurality of print heads 41 to generate the aggregation of the ink or the like in the high-density printing.

In this regard, it is possible to suppress deterioration in print quality in both the low-density printing and the high density printing by selectively using different patterns (mask application modes) with respect to the application of the "mask pattern" according to the required printing density.

In the present embodiment, the "ejection specification data" is the "mask pattern" defining whether to eject the ink from the print head 41 to each position in the print target area of the nail as the print target, and the printing control unit 313 controls the ejection operation of the print head 41 based on the "mask pattern".

As a result, it is possible to perform control such that the ink ejection from the print heads 41 is accurately dispersed, and it is possible to suppress roughness caused when a portion where no ink is ejected and a portion where ink is ejected in an overlapping manner exist together.

Further, in the present embodiment, for example, what is configured to eject the ink equally from the respective nozzles of the print head 41, such as a dither mask, is used as the "mask pattern" which is the "ejection specification data".

Therefore, positions where the ink is ejected can be dispersed, and a situation in which pixels that are not printed are concentrated in a certain column or a certain range or pixels that are printed in a duplicated manner are continuous is unlikely to occur. As a result, a portion without being coated with the ink, duplicated printing, and the like can be suppressed, and a printing result without roughness and the like can be obtained.

Furthermore, in the present embodiment, the liquid agent is the undercoating ink for printing the undercoating that is formed before printing the nail design or the like, and the printing control unit 313 controls the ejection operation of the print head 41 to perform printing a plurality of times in an overlapping manner with the print target area of the nail as the print target.

The white ink or the like used as the undercoating ink has relatively low concealability, and there is a case where a density that can make the nail design clearly stand out is not obtainable by one-time printing.

Even in such printing with the ink having low concealability, a sufficient density can be obtained by performing overcoating a plurality of times, the concealability is improved, and the reproducibility of the ink color at the time of nail design printing can be improved. This makes it possible to print a vivid nail design on the formed undercoating.

Furthermore, the print head 41 can print the undercoating before printing the design, the control unit 31 sets the printing density of the undercoating to be printed, and the print head 41 prints the undercoating at the undercoating printing density set by the control unit 31.

Therefore, the nail printing can be performed at a transparent effect level suitable for printing of the design.

Furthermore, the transparent effect level (the degree of concealability by the undercoating ink) suitable for printing varies depending on the type and tendency of the design, and there may be a case where it is more beautiful when there is no transparency (the printing density is high and the concealability is high), and a case where it is more beautiful when there is the transparent effect (transparency).

In this regard, the control unit 31 sets the undercoating printing density based on the design in the present embodiment.

Therefore, the nail printing can be performed at a transparent effect level suitable for printing, which can enhance the design.

The printing density is defined by the ejection amount of the liquid agent from the print head 41.

Therefore, a desired printing density can be achieved by controlling the printing operation of the print head 41.

Although the embodiment of the present disclosure has been described as above, the present disclosure is not limited to the embodiment, and it goes without saying that various modifications can be made within a scope not departing from a gist of the present disclosure.

For example, the example in which at least the "first mode" and the "second mode" are provided with respect to the application of the "ejection specification data" and the printing control unit 313 switches between the "first mode" and the "second mode" based on the "mask mode switching value" that is the threshold of the "set ejection amount" ("preset density threshold") in the case of performing the undercoating printing has been described in the present embodiment, but the mode switching with respect to the application of the "ejection specification data" is not limited to the case of the undercoating printing.

For example, in a case where a nail design is printed, mode switching may be performed with respect to the application of "ejection specification data". In a case where plain color printing is performed even in the design printing, there are various demands such as a case where it is desired to perform printing at a high density and a case where it is desired to perform printing at a low density with transparency, and the mode switching may be appropriately performed according to user's preference or the like.

In addition, in the present embodiment, the case where printing is performed by the three print heads 41 (the head A, the head B, and the head C) has been described as the example, and a value divided by the number of heads of three has been used when the printing is equally shared, but the number of the print heads 41 in charge of printing is not limited to three. Printing may be shared by a larger number.

Further, the case where the undercoating head **41*a* and the design head 41*b* are integrally configured as the print head 41 and are held by the same holder 42 and provided in one printing apparatus has been exemplified in the above embodiment, but the configuration of the print head 41** is not limited thereto.

For example, the undercoating head and the design head may be separated and held in different holders 42.

Furthermore, there may be a mode in which a printing apparatus that includes only an undercoating head and performs undercoating printing and a printing apparatus that includes only a design head and prints a design are separately provided, and the undercoating and the design are printed by the separate printing apparatuses.

In addition, the case where the printing apparatus 1 and the terminal device 7 cooperate to perform printing has been given as an example in the above embodiment, but all the operations may be completed only by the printing apparatus 1.

In this case, the printing apparatus 1 may be provided with a display unit capable of confirming an image and a design of the nail.

In addition, for example, a design storage area or the like configured to store nail designs may be provided in the storage unit 32 of the printing apparatus 1, and the designs stored here may be proposed (displayed) to a user to allow the user to select any design.

When the printing apparatus 1 can be connected to various networks, it may be configured such that a nail design (design), stored in a server device (not illustrated) or the like connectable to the network, can be acquired. In a case where the externally acquired design can be proposed to the user as a candidate for the selectable nail design in this manner, a wide variety of nail designs can be printed on the nail.

Although the case where the control unit 81 on the terminal device 7 side performs processing such as the detection of the nail information, and the generation of the print data has been described in the present embodiment, it is not essential to perform all these processes on the terminal device side. Some or all of these processes may be performed by the control unit 31 of the printing apparatus 1.

In a case where various processes are shared between the printing apparatus 1 side and the terminal device 7 side as described above, loads on the control devices 30 and 80 (loads in terms of the processing capabilities of the control units 31 and 81 and loads in terms of memory capacities of the storage units 32 and 82) are also distributed, and the load on each unit can be reduced.

Although the embodiment of the present disclosure has been described above, a scope of the present disclosure is not limited to the above-described embodiment, and includes a scope of inventions described in the claims and a scope of the equivalents thereof.

What is claimed is:

1. A printing apparatus comprising:

a print head that includes a plurality of nozzles ejecting a liquid agent and performs printing on a print target; and at least one processor configured to control an ejection operation of the print head based on ejection specification data defining ejection of the liquid agent, wherein:

at least a first mode and a second mode are provided with respect to application of the ejection specification data, the processor switches between the first mode and the second mode based on a set printing density, and when a plurality of the print heads are provided, the processor is configured to control the ejection operation in the first mode in which common ejection specification data is applied to all the print heads in a case where printing is performed at a density lower than a threshold of the set printing density, and to control the ejection operation in the second mode in which individual ejection specification data is applied to each of the print heads in a case where printing is performed at a density higher than the threshold of the set printing density.

2. The printing apparatus according to claim 1, wherein:

the ejection specification data comprises a mask pattern defining whether to cause the liquid agent to be ejected from the print head to each of positions of a print target area of the print target, and the processor is configured to control the ejection operation of the print head based on the mask pattern.

3. The printing apparatus according to claim 1, wherein the ejection specification data is configured to cause the liquid agent to be equally ejected from the nozzles of the print head.

4. The printing apparatus according to claim 1, wherein;

the liquid agent comprises an undercoating ink for printing an undercoating, and the processor is configured to control the ejection operation of the print head to perform printing a plurality of times in an overlapping manner on a print target area of the print target.

5. The printing apparatus according to claim 1, wherein:

the print head is controllable to print an undercoating before printing a design, the processor is configured to set a printing density of the undercoating to be printed, and the print head prints the undercoating at the printing density of the undercoating set by the processor.

6. The printing apparatus according to claim 5, wherein the processor is configured to set the printing density of the undercoating based on the design.

7. The printing apparatus according to claim 1, wherein the printing density is defined by an ejection amount of the liquid agent from the print head.

8. A printing control method performed by at least one processor, the method comprising:

switching between a first mode and a second mode based on a set printing density in a case where an ejection operation of a print head, which includes a plurality of nozzles ejecting a liquid agent and performs printing on a print target, is controlled based on ejection specification data defining ejection of the liquid agent, wherein:

at least the first mode and the second mode are provided with respect to application of the ejection specification data, and when a plurality of the print heads are provided, the method comprises controlling the ejection operation in the first mode in which common ejection specification data is applied to all the print heads in a case where printing is performed at a density lower than a threshold of the set printing density, and controlling the ejection operation in the second mode in which individual ejection specification data is applied to each of the print heads in a case where printing is performed at a density higher than the threshold of the set printing density.

9. A non-transitory computer-readable recording medium having a program stored thereon which, when executed by at least one processor of a computer, controls the computer to execute processes comprising:

switching between a first mode and a second mode based on a set printing density in a case where an ejection operation of a print head, which includes a plurality of nozzles ejecting a liquid agent and performs printing on a print target, is controlled based on ejection specification data defining ejection of the liquid agent, wherein:

at least the first mode and the second mode are provided with respect to application of the ejection specification data, and the processes executed by the computer include, when a plurality of the print heads are provided, controlling the ejection operation in the first mode in which common ejection specification data is applied to all the print heads in a case where printing is performed at a density lower than a threshold of the set printing density, and controlling the ejection operation in the second mode in which individual ejection specification data is applied to each of the print heads in a case where printing is performed at a density higher than the threshold of the set printing density.

* * * * *